US012438658B2

(12) United States Patent
Maamari et al.

(10) Patent No.: US 12,438,658 B2
(45) Date of Patent: Oct. 7, 2025

(54) SKIPPED RESOURCES OF A GRANT

(71) Applicant: QUALCOMM Incorporated, San Diego, CA (US)

(72) Inventors: Diana Maamari, San Diego, CA (US); Yih-Hao Lin, San Diego, CA (US); Prashanth Haridas Hande, San Diego, CA (US); Jing Sun, San Diego, CA (US); Mickael Mondet, Louannec (FR); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 17/659,433

(22) Filed: Apr. 15, 2022

(65) Prior Publication Data
US 2023/0336292 A1 Oct. 19, 2023

(51) Int. Cl.
*H04W 72/11* (2023.01)
*H04L 5/00* (2006.01)
*H04W 72/115* (2023.01)
*H04W 72/1268* (2023.01)
*H04W 72/21* (2023.01)
*H04W 72/23* (2023.01)

(52) U.S. Cl.
CPC .......... *H04L 5/0042* (2013.01); *H04L 5/0051* (2013.01); *H04L 5/0098* (2013.01)

(58) Field of Classification Search
CPC ... H04L 5/0042; H04L 5/0051; H04L 5/0098; H04L 5/0096; H04W 72/11; H04W 72/21; H04W 72/115; H04W 72/1268; H04W 72/23
See application file for complete search history.

(56) References Cited

U.S. PATENT DOCUMENTS

| 2015/0208366 | A1* | 7/2015 | Papasakellariou .. H04W 52/367 370/311 |
| 2019/0363843 | A1* | 11/2019 | Gordaychik ........ H04W 72/044 |
| 2021/0111831 | A1* | 4/2021 | Babaei .................. H04W 76/27 |
| 2021/0144743 | A1* | 5/2021 | Rastegardoost ...... H04W 72/23 |

FOREIGN PATENT DOCUMENTS

WO WO-2021248438 12/2021

OTHER PUBLICATIONS

International Search Report and Written Opinion—PCT/US2023/017758—ISA/EPO—Sep. 1, 2023.
NEC: "Views on Rel-18 XR", 3GPP TSG RAN #94-e, RP-213333, 3rd Generation Partnership Project (3GPP), Mobile Competence Centre, 650, Route Des Lucioles, F-06921 Sophia-Antipolis Cedex, France, vol. TSG RAN, No. e-Meeting, Dec. 6, 2021-Dec. 17, 2021, Nov. 29, 2021, pp. 1-4, XP052097431, Paragraph [02.2], Section 2.2.

* cited by examiner

Primary Examiner — Kwang B Yao
Assistant Examiner — Patrick Yipao Pei
(74) Attorney, Agent, or Firm — Harrity & Harrity, LLP

(57) ABSTRACT

Various aspects of the present disclosure generally relate to wireless communication. In some aspects, a user equipment (UE) may receive a grant for a physical uplink channel. The UE may select skipped resources that include one or more of frequency resources or time resources in the grant to skip for a communication on the physical uplink channel. The UE may transmit uplink control information (UCI) that indicates the skipped resources or non-skipped resources of the grant. The UE may transmit the communication using the non-skipped resources and not the skipped resources. Numerous other aspects are described.

25 Claims, 21 Drawing Sheets

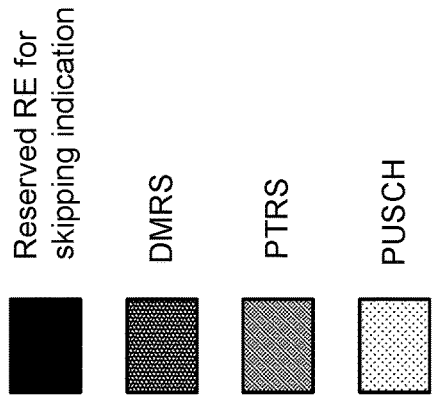
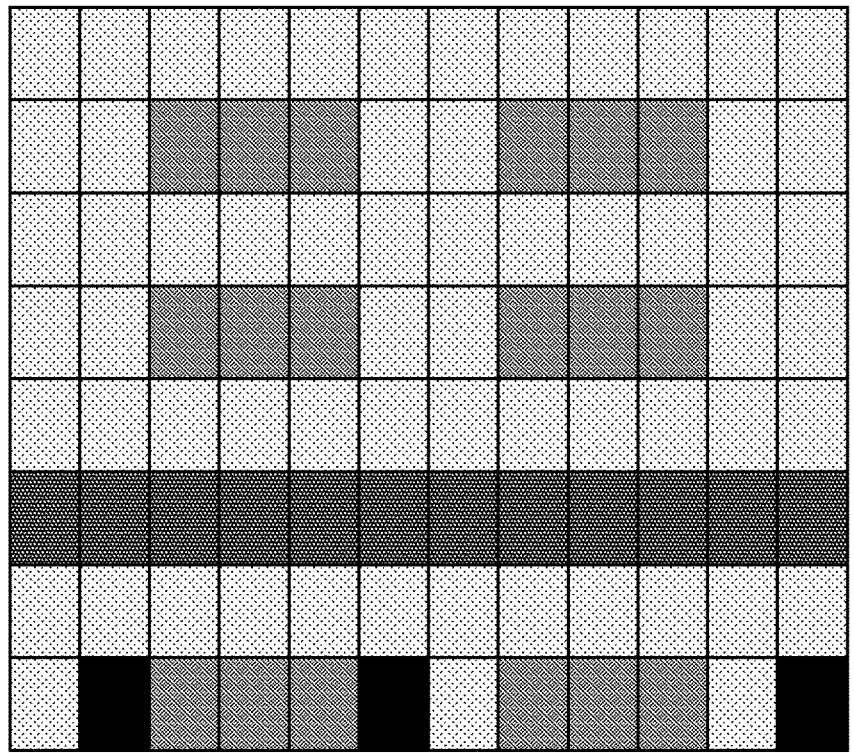
FIG. 13

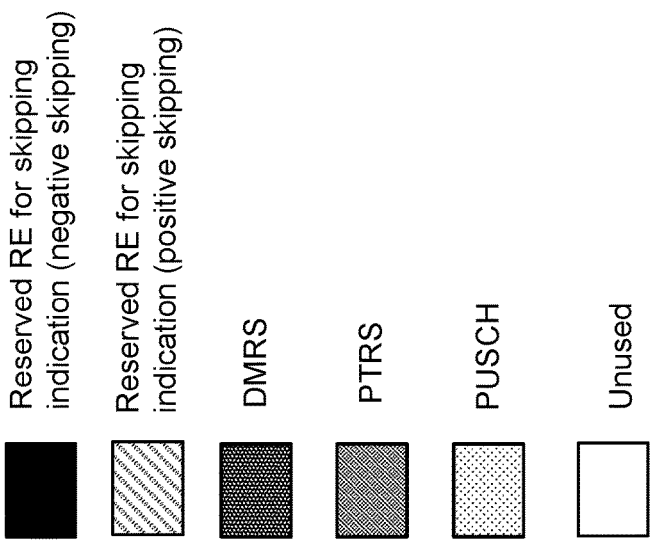
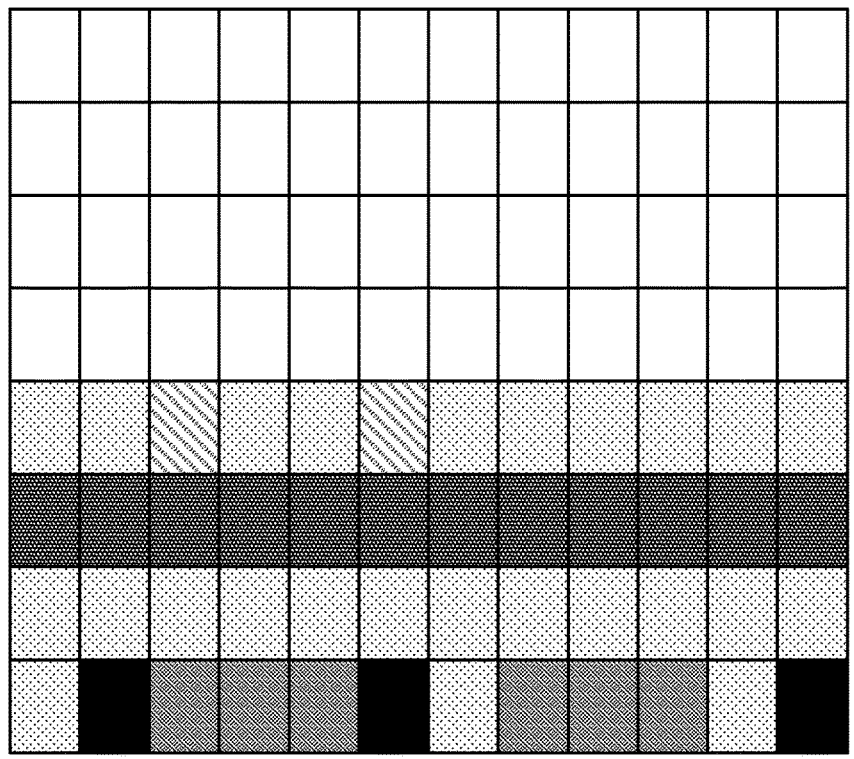
FIG. 14

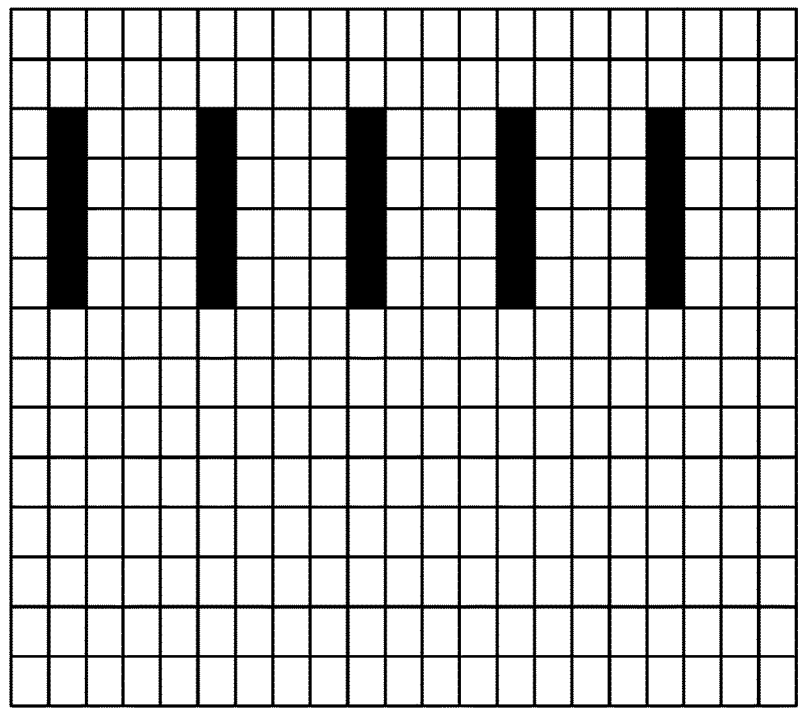
 Comb Pattern
1500
FIG. 15

SKIPPED RESOURCES OF A GRANT

FIELD OF THE DISCLOSURE

Aspects of the present disclosure generally relate to wireless communication and to techniques and apparatuses for skipping resources of a dynamic grant or a configured grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a grant for a physical uplink channel. The method may include selecting skipped resources that include one or more of frequency resources or time resources in the grant to skip for a communication on the physical uplink channel. The method may include transmitting uplink control information (UCI) that indicates the skipped resources or non-skipped resources of the grant. The method may include transmitting the communication using the non-skipped resources and not the skipped resources.

Some aspects described herein relate to a method of wireless communication performed by a UE. The method may include receiving a plurality of grant resource allocations for a physical uplink channel. The method may include selecting a subset of the grant resource allocations. The method may include transmitting a communication using the subset of the grant resource allocations.

Some aspects described herein relate to a method of wireless communication performed by a UE. The method may include receiving a grant for a physical uplink channel. The method may include selecting skipped resources that include one or more of frequency resources or time resources in the grant to skip for a communication on the physical uplink channel. The method may include transmitting the communication with one or more resource elements (REs) that indicate the skipped resources in the communication.

Some aspects described herein relate to a method of wireless communication performed by a network entity. The method may include transmitting a grant for a physical uplink channel. The method may include receiving information that indicates skipped resources that include one or more of frequency resources or time resources in the grant that are to be skipped for a communication on the physical uplink channel or that indicates non-skipped resources. The method may include receiving the communication. The method may include decoding, based at least in part on the information, the communication in the non-skipped resources and not in the skipped resources.

Some aspects described herein relate to a UE for wireless communication. The user equipment may include a memory and one or more processors coupled to the memory. The one or more processors may be configured to receive a grant for a physical uplink channel. The one or more processors may be configured to select skipped resources that include one or more of frequency resources or time resources in the grant to skip for a communication on the physical uplink channel. The one or more processors may be configured to transmit UCI that indicates the skipped resources or non-skipped resources of the grant. The one or more processors may be configured to transmit the communication using the non-skipped resources and not the skipped resources.

Some aspects described herein relate to a UE for wireless communication. The user equipment may include a memory and one or more processors coupled to the memory. The one or more processors may be configured to receive a plurality of grant resource allocations for a physical uplink channel. The one or more processors may be configured to select a subset of the grant resource allocations. The one or more processors may be configured to transmit a communication using the subset of the grant resource allocations.

Some aspects described herein relate to a UE for wireless communication. The user equipment may include a memory and one or more processors coupled to the memory. The one or more processors may be configured to receive a grant for a physical uplink channel. The one or more processors may be configured to select skipped resources that include one or more of frequency resources or time resources in the grant to skip for a communication on the physical uplink channel. The one or more processors may be configured to transmit the communication with one or more REs that indicate the skipped resources in the communication.

Some aspects described herein relate to a network entity for wireless communication. The network entity may include a memory and one or more processors coupled to the memory. The one or more processors may be configured to transmit a grant for a physical uplink channel. The one or more processors may be configured to receive information that indicates skipped resources that include one or more of frequency resources or time resources in the grant that are to be skipped for a communication on the physical uplink channel or that indicates non-skipped resources. The one or more processors may be configured to receive the communication. The one or more processors may be configured to decode, based at least in part on the information, the communication in the non-skipped resources and not in the skipped resources.

Some aspects described herein relate to a non-transitory computer-readable medium that stores a set of instructions for wireless communication by a UE. The set of instructions, when executed by one or more processors of the UE, may cause the UE to receive a grant for a physical uplink channel. The set of instructions, when executed by one or more processors of the UE, may cause the UE to select skipped resources that include one or more of frequency resources or time resources in the grant to skip for a communication on the physical uplink channel. The set of instructions, when executed by one or more processors of the UE, may cause the UE to transmit UCI that indicates the skipped resources or non-skipped resources of the grant. The set of instructions, when executed by one or more processors of the UE, may cause the UE to transmit the communication using the non-skipped resources and not the skipped resources.

Some aspects described herein relate to a non-transitory computer-readable medium that stores a set of instructions for wireless communication by a UE. The set of instructions, when executed by one or more processors of the UE, may cause the UE to receive a plurality of grant resource allocations for a physical uplink channel. The set of instructions, when executed by one or more processors of the UE, may cause the UE to select a subset of the grant resource allocations. The set of instructions, when executed by one or more processors of the UE, may cause the UE to transmit a communication using the subset of the grant resource allocations.

Some aspects described herein relate to a non-transitory computer-readable medium that stores a set of instructions for wireless communication by a UE. The set of instructions, when executed by one or more processors of the UE, may cause the UE to receive a grant for a physical uplink channel. The set of instructions, when executed by one or more processors of the UE, may cause the UE to select skipped resources that include one or more of frequency resources or time resources in the grant to skip for a communication on the physical uplink channel. The set of instructions, when executed by one or more processors of the UE, may cause the UE to transmit the communication with one or more REs that indicate the skipped resources in the communication.

Some aspects described herein relate to a non-transitory computer-readable medium that stores a set of instructions for wireless communication by a network entity. The set of instructions, when executed by one or more processors of the network entity, may cause the network entity to transmit a grant for a physical uplink channel. The set of instructions, when executed by one or more processors of the network entity, may cause the network entity to receive information that indicates skipped resources that include one or more of frequency resources or time resources in the grant that are to be skipped for a communication on the physical uplink channel or that indicates non-skipped resources. The set of instructions, when executed by one or more processors of the network entity, may cause the network entity to receive the communication. The set of instructions, when executed by one or more processors of the network entity, may cause the network entity to decode, based at least in part on the information, the communication in the non-skipped resources and not in the skipped resources.

Some aspects described herein relate to an apparatus for wireless communication. The apparatus may include means for receiving a grant for a physical uplink channel. The apparatus may include means for selecting skipped resources that include one or more of frequency resources or time resources in the grant to skip for a communication on the physical uplink channel. The apparatus may include means for transmitting UCI that indicates the skipped resources or non-skipped resources of the grant. The apparatus may include means for transmitting the communication using the non-skipped resources and not the skipped resources.

Some aspects described herein relate to an apparatus for wireless communication. The apparatus may include means for receiving a plurality of grant resource allocations for a physical uplink channel. The apparatus may include means for selecting a subset of the grant resource allocations. The apparatus may include means for transmitting a communication using the subset of the grant resource allocations.

Some aspects described herein relate to an apparatus for wireless communication. The apparatus may include means for receiving a grant for a physical uplink channel. The apparatus may include means for selecting skipped resources that include one or more of frequency resources or time resources in the grant to skip for a communication on the physical uplink channel. The apparatus may include means for transmitting the communication with one or more REs that indicate the skipped resources in the communication.

Some aspects described herein relate to an apparatus for wireless communication. The apparatus may include means for transmitting a grant for a physical uplink channel. The apparatus may include means for receiving information that indicates skipped resources that include one or more of frequency resources or time resources in the grant that are to be skipped for a communication on the physical uplink channel or that indicates non-skipped resources. The apparatus may include means for receiving the communication. The apparatus may include means for decoding, based at least in part on the information, the communication in the non-skipped resources and not in the skipped resources.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 13 is a diagram illustrating an example of skipping indications, in accordance with the present disclosure.

FIG. 14 is a diagram illustrating an example of skipping indications, in accordance with the present disclosure.

FIG. 15 is a diagram illustrating an example of skipping indications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
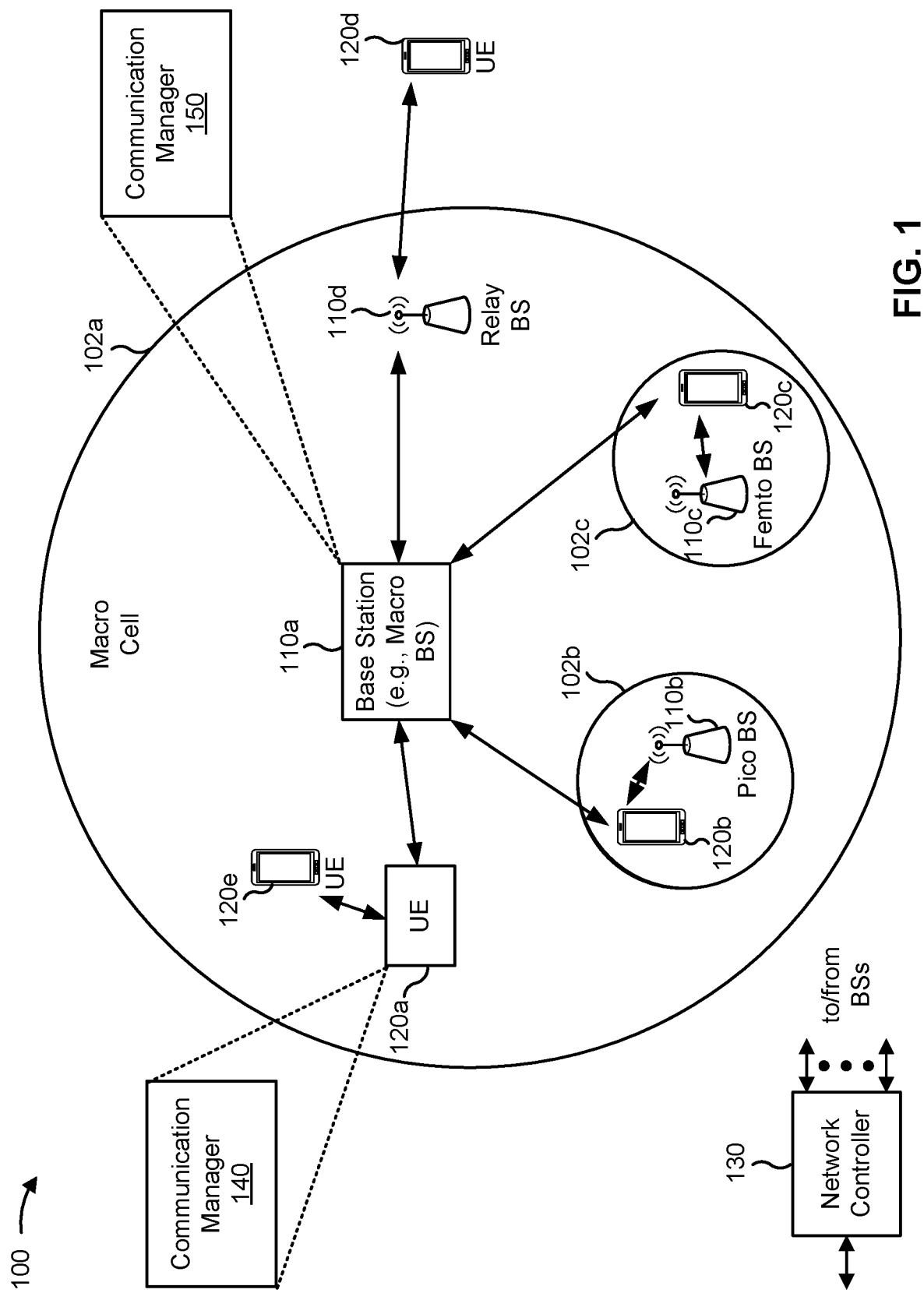
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a grant for a physical uplink channel and select skipped resources that include one or more of frequency resources or time resources in the grant to skip for a communication on the physical uplink channel. The communication manager 140 may transmit uplink control information (UCI) that indicates the skipped resources or non-skipped resources of the grant and transmit the communication using the non-skipped resources and not the skipped resources.

In some aspects, the communication manager 140 may receive a plurality of grant resource allocations for a physical uplink channel, select a subset of the grant resource allocations, and transmit a communication using the subset of the grant resource allocations. Additionally, or alternatively, the communication manager 140 may perform one or more other operations described herein.

In some aspects, the communication manager 140 may receive a grant for a physical uplink channel, select skipped resources that include one or more of frequency resources or time resources in the grant to skip for a communication on the physical uplink channel, and transmit the communication with one or more REs that indicate the skipped resources in the communication. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit a grant for a physical uplink channel and receive information that indicates skipped resources that include one or more of frequency resources or time resources in the grant that are to be skipped for a communication on the physical uplink channel or that indicates non-skipped resources; receive the communication. The communication manager 150 may decode, based at least in part on the information, the communication in the non-skipped resources and not in the skipped resources. Additionally, or alternatively, the communication manager 150 may perform one or more other operations described herein.

As indicated above, FIG. 1 is provided as an example. Other examples may differ from what is described with regard to FIG. 1.

Figure 2:
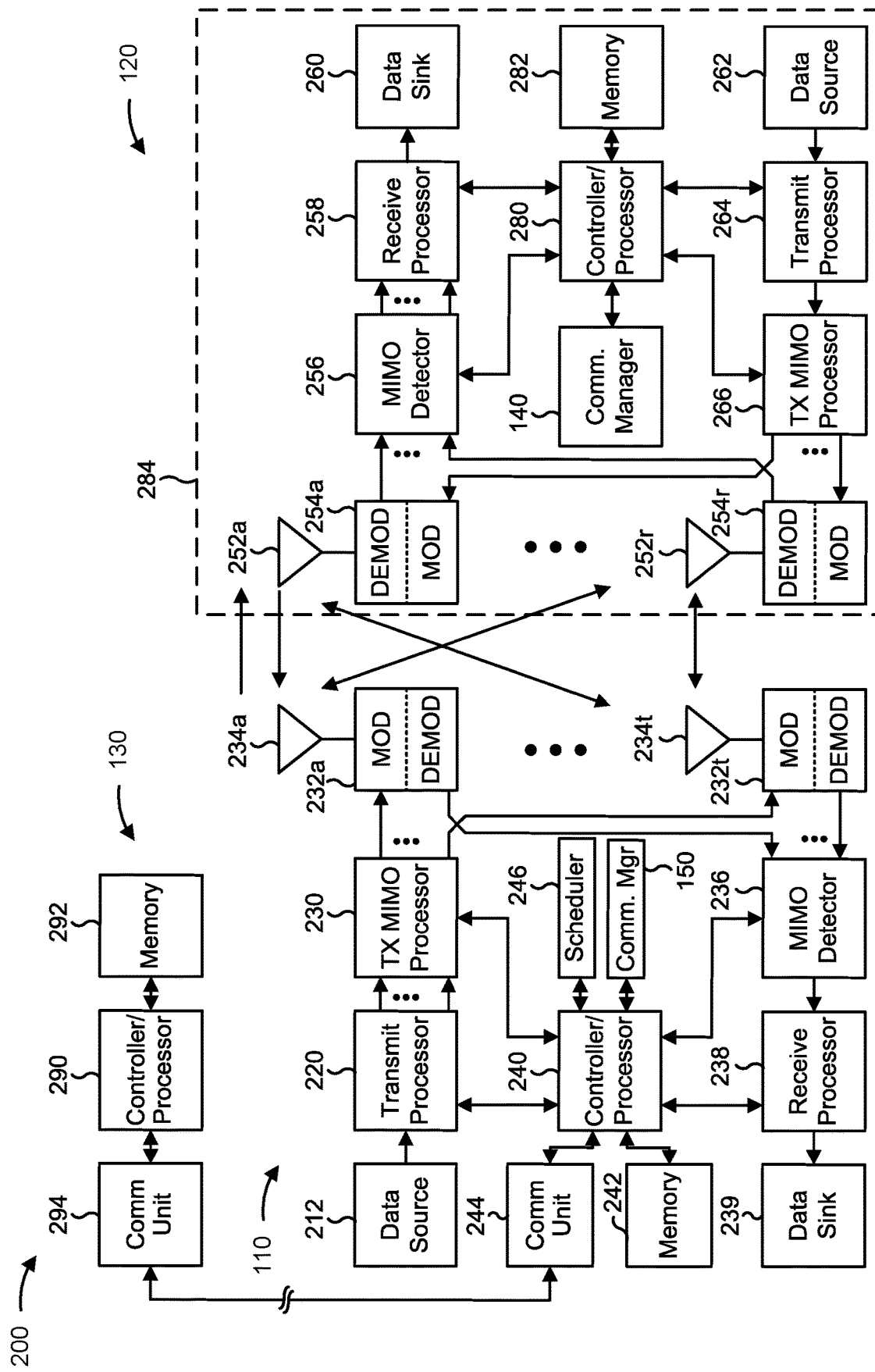
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas ($T \geq 1$). The UE 120 may be equipped with a set of antennas 252a through 252r, such as R antennas ($R \geq 1$).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-21).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-21).

A controller/processor of a network entity, (e.g., the controller/processor 240 of the base station 110), the controller/processor 280 of the UE 120, and/or any other component(s) of FIG. 2 may perform one or more techniques associated with skipping resources of a dynamic grant or a configured grant, as described in more detail elsewhere herein. For example, the controller/processor 240 of the base station 110, the controller/processor 280 of the UE 120, and/or any other component(s) of FIG. 2 may perform or direct operations of, for example, process 1600 of FIG. 16, process 1700 of FIG. 17, process 1800 of FIG. 18, process 1900 of FIG. 19, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1600 of FIG. 16, process 1700 of FIG. 17, process 1800 of FIG. 18, process 1900 of FIG. 19, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a grant for a physical uplink channel; means for selecting skipped resources that include one or more of frequency resources or time resources in the grant to skip for a communication on the physical uplink channel; means for transmitting UCI that indicates the skipped resources or non-skipped resources of the grant; and/or means for transmitting the communication using the non-skipped resources and not the skipped resources. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a plurality of grant resource allocations for a physical uplink channel; means for selecting a subset of the grant resource allocations; and/or means for transmitting a communication using the subset of the grant resource allocations.

In some aspects, the UE 120 includes means for receiving a grant for a physical uplink channel; means for selecting skipped resources that include one or more of frequency resources or time resources in the grant to skip for a communication on the physical uplink channel; and/or means for transmitting the communication with one or more REs that indicate the skipped resources in the communication.

In some aspects, a network entity (e.g., a base station 110) includes means for transmitting a grant for a physical uplink channel; means for receiving information that indicates skipped resources that include one or more of frequency resources or time resources in the grant that are to be skipped for a communication on the physical uplink channel or that indicates non-skipped resources; means for receiving the communication; and/or means for decoding, based at least in part on the information, the communication in the non-skipped resources and not in the skipped resources. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
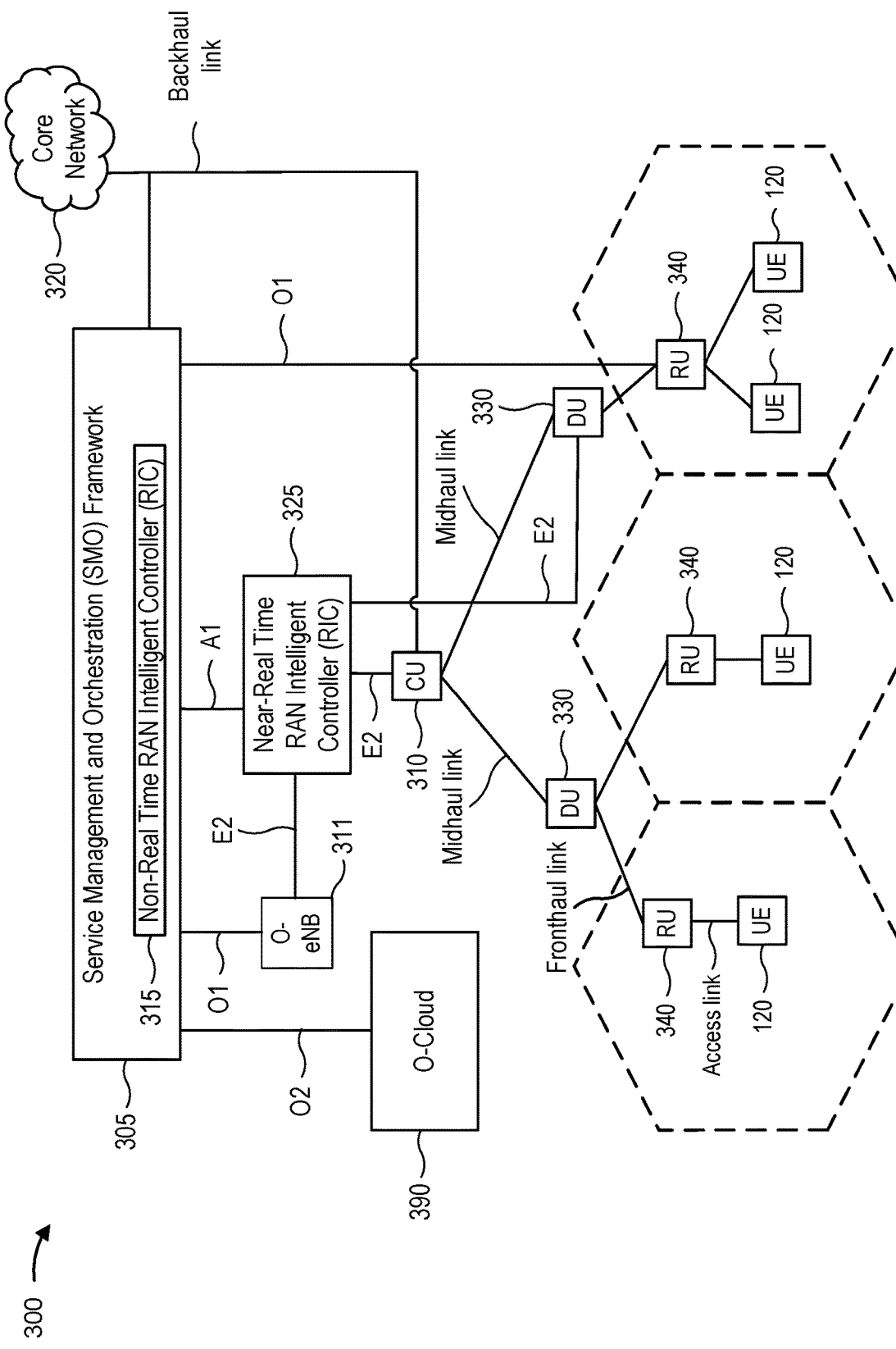
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)).

Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs")" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
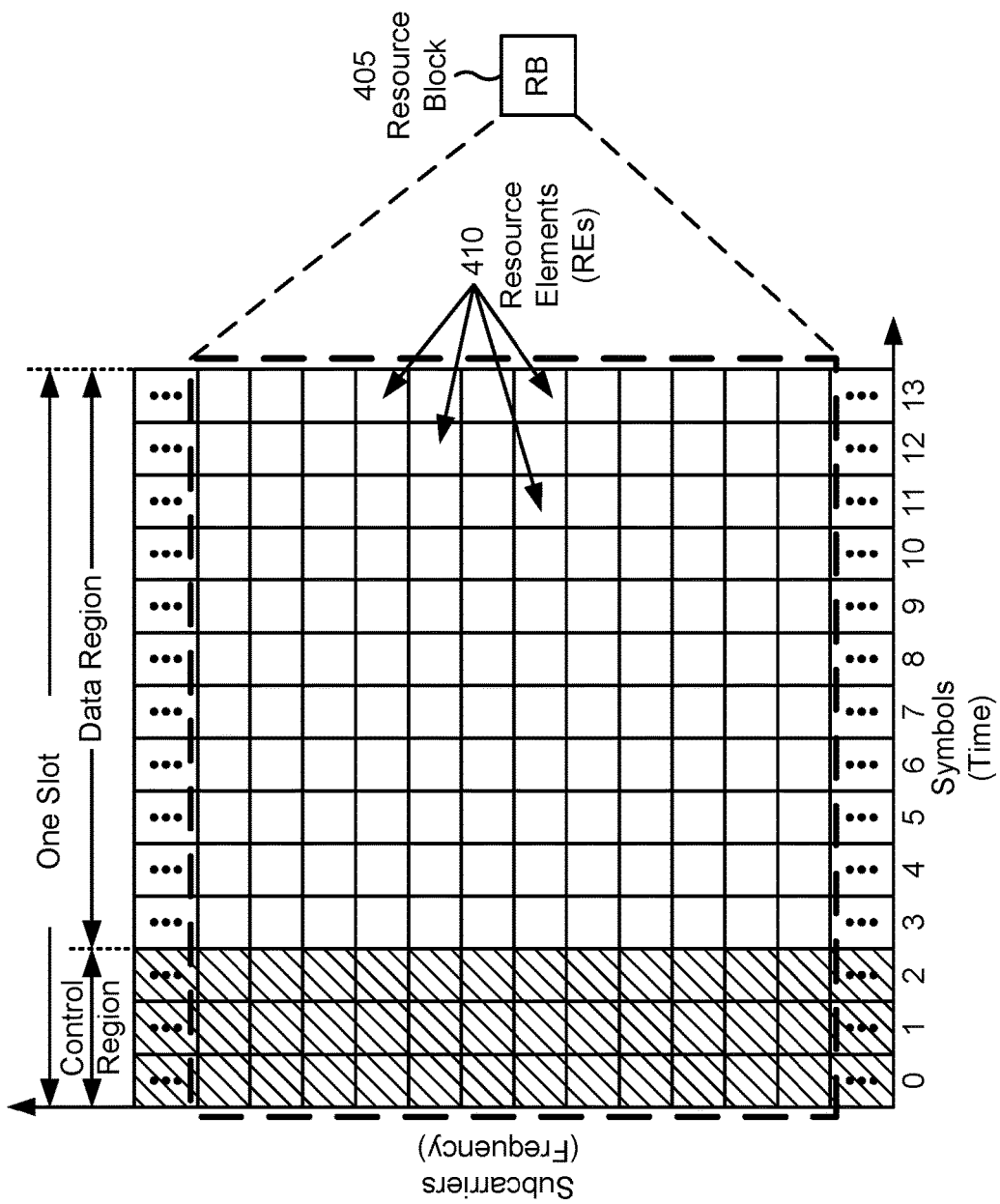
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a network entity (e.g., base station 110) as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

Figure 5:
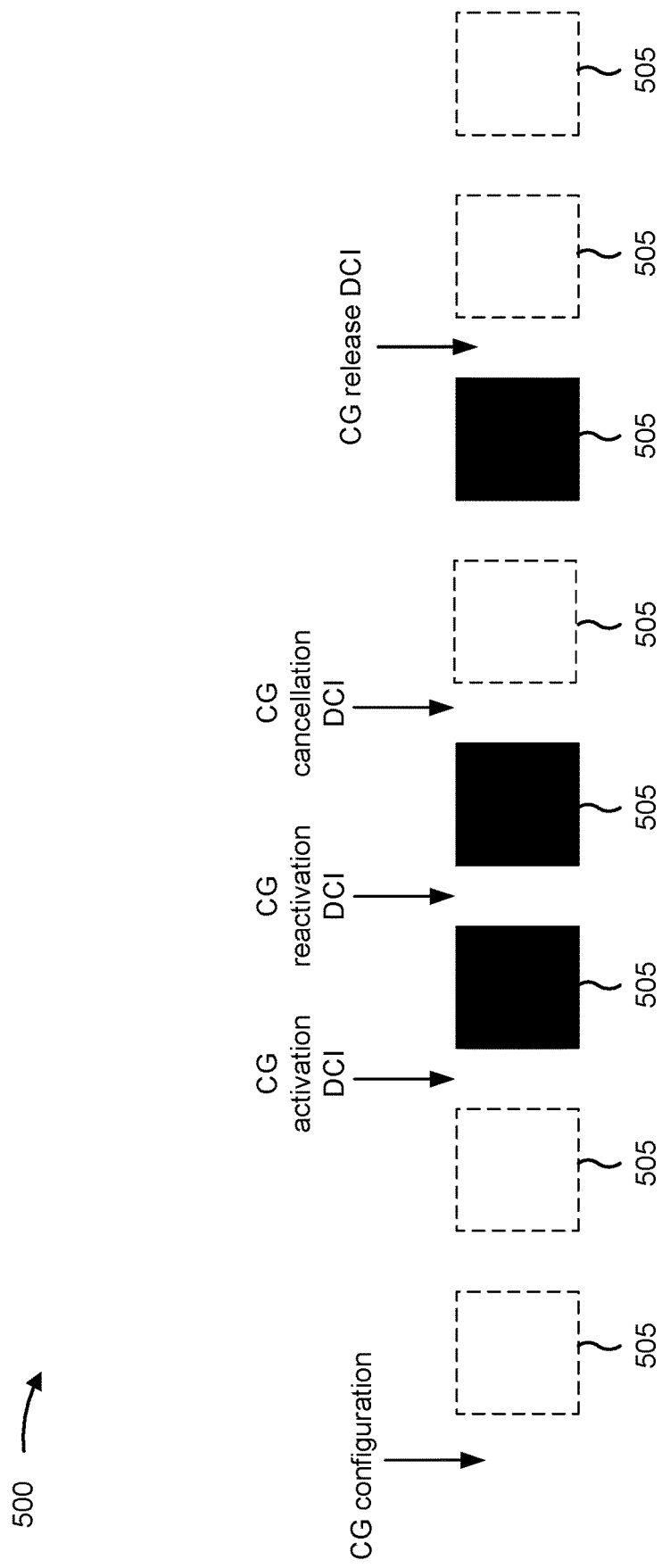
FIG. 5 is a diagram illustrating an example of uplink configured grant communication, in accordance with the present disclosure.

FIG. 5 is a diagram illustrating an example 500 of uplink configured grant (CG) communication, in accordance with the present disclosure.

In some aspects, PRBs for uplink communications may be granted dynamically, such as with a scheduling request (SR) or a buffer status report (BSR). A UE may first transmit an SR on a physical uplink control channel (PUCCH), requesting radio resources in the uplink when the UE has pending data in its buffer. With periodic BSR reporting, the network entity knows the available buffer at the UE. The network entity then transmits an uplink grant downlink control information (DCI). The allocated resources are specified in the DCI for the UE to transmit a communication on the physical uplink shared channel (PUSCH).

Alternatively, PRBs for uplink communications may be granted according to a configuration. For example, CG communications may include periodic uplink communications that are configured for a UE, such that the network entity does not need to send separate DCI to schedule each uplink communication, thereby conserving signaling overhead.

As shown in example 500, a UE (e.g., a UE 120) may be configured with a CG configuration for CG communications. For example, the UE may receive the CG configuration via an RRC message transmitted by a network entity (e.g., a base station 110). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 505 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network entity may transmit CG activation DCI to the UE to activate the CG configuration for the UE. The network entity may indicate, in the CG activation DCI, communication parameters, such as an MCS, an RB allocation, and/or antenna ports, for the CG PUSCH communications to be transmitted in the scheduled CG occasions 505. The UE may begin transmitting in the CG occasions 505 based at least in part on receiving the CG activation DCI. For example, beginning with a next scheduled CG occasion 505 subsequent to receiving the CG activation DCI, the UE may transmit a PUSCH communication in the scheduled CG occasions 505 using the communication parameters indicated in the CG activation DCI. The UE may refrain from transmitting in configured CG occasions 505 prior to receiving the CG activation DCI.

The network entity may transmit CG reactivation DCI to the UE to change the communication parameters for the CG PUSCH communications. Based at least in part on receiving the CG reactivation DCI, and the UE may begin transmitting in the scheduled CG occasions 505 using the communication parameters indicated in the CG reactivation DCI. For example, beginning with a next scheduled CG occasion 505 subsequent to receiving the CG reactivation DCI, the UE may transmit PUSCH communications in the scheduled CG occasions 505 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 505 for the UE. The CG cancellation DCI may deactivate only a subsequent one CG occasion 505 or a subsequent N CG occasions 505 (where N is an integer). CG occasions 505 after the one or more (e.g., N) CG occasions 505 subsequent to the CG cancellation DCI may remain activated. Based at least in part on receiving the CG cancellation DCI, the UE may refrain from transmitting in the one or more (e.g., N) CG occasions 505 subsequent to receiving the CG cancellation DCI. As shown in example 500, the CG cancellation DCI cancels one subsequent CG occasion 505 for the UE. After the CG occasion 505 (or N CG occasions) subsequent to receiving the CG cancellation DCI, the UE may automatically resume transmission in the scheduled CG occasions 505.

The network entity may transmit CG release DCI to the UE to deactivate the CG configuration for the UE. The UE may stop transmitting in the scheduled CG occasions 505 based at least in part on receiving the CG release DCI. For example, the UE may refrain from transmitting in any scheduled CG occasions 505 until another CG activation DCI is received from the base station. Whereas the CG cancellation DCI may deactivate only a subsequent one CG occasion 505 or a subsequent N CG occasions 505, the CG release DCI deactivates all subsequent CG occasions 505 for a given CG configuration for the UE until the given CG configuration is activated again by a new CG activation DCI.

With dynamic grants, RB allocation in the uplink may match the information bits of a communication and thus use less power. However, transmitting an SR and waiting for an uplink grant increases latency. With CG, RB allocation might be more than what is needed for the UE information bits, and more power may be consumed than necessary. The UE will have to pad the information bits such that all the allocated resources to the UE are used. If the UE has no information bits, (no packet convergence data protocol PDCP packets pending) or fewer information bits, the UE may still be required to transmit over the allocation resources.

As indicated above, FIG. 5 is provided as an example. Other examples may differ from what is described with respect to FIG. 5.

Figure 6:
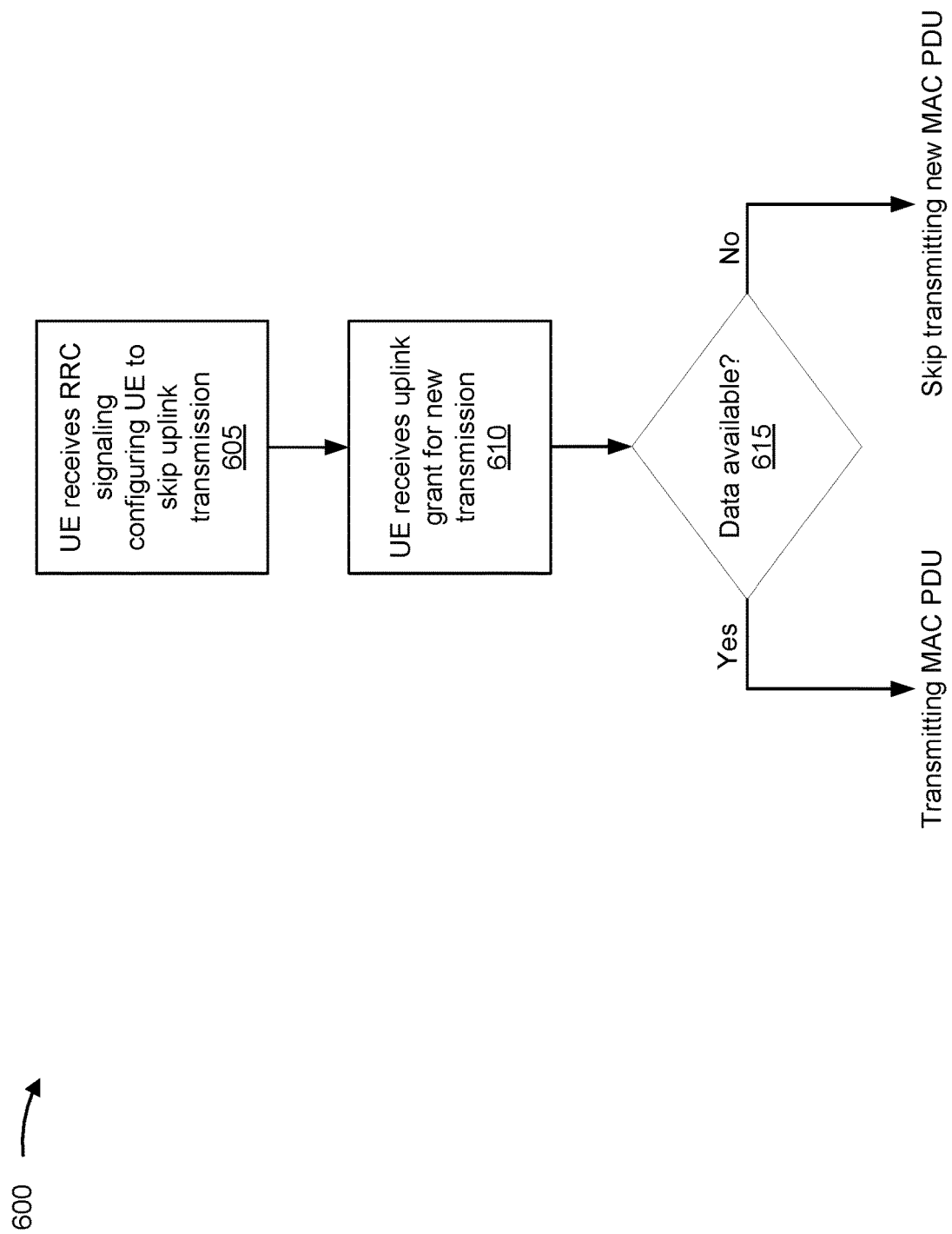
FIG. 6 is a diagram illustrating an example of skipping a communication associated with a grant, in accordance with the present disclosure.

FIG. 6 is a diagram illustrating an example 600 of skipping a communication associated with a grant, in accordance with the present disclosure.

With CG scheduling, resource allocation may be large, resource utilization may be high, interference in the uplink may increase, and power consumption may be higher. The higher power consumption may increase the thermal properties of the UE, which may be an important issue for extended reality (XR) devices or augmented reality (AR) devices.

In some aspects, a UE may skip or ignore a communication associated with a grant, whether a dynamic grant or a CG. Otherwise, the UE transmits padded bits over the allocated resources (e.g., RBs), even though the information bits may not require the allocated number of RBs for transmission. The allocated number of RBs may be an overallocation.

Example 600 shows that a UE may skip a communication associated with a grant. As shown by reference number 605, the UE may receive a configuration (e.g., via RRC) that configures the UE to be able to skip a communication associated with a grant. As shown by reference number 610, the UE may receive the grant for an uplink communication. As shown by reference number 615, the UE may transmit the uplink communication (e.g., MAC protocol data unit (PDU)) if data is available. Power consumption may increase if the grant is larger. If no data is available, the UE may not transmit the uplink communication. However, latency may increase if there are a few bits that need to be transmitted, because the bits may be transmitted in a later MAC PDU.

As indicated above, FIG. 6 is provided as an example. Other examples may differ from what is described with respect to FIG. 6.

Figure 7:
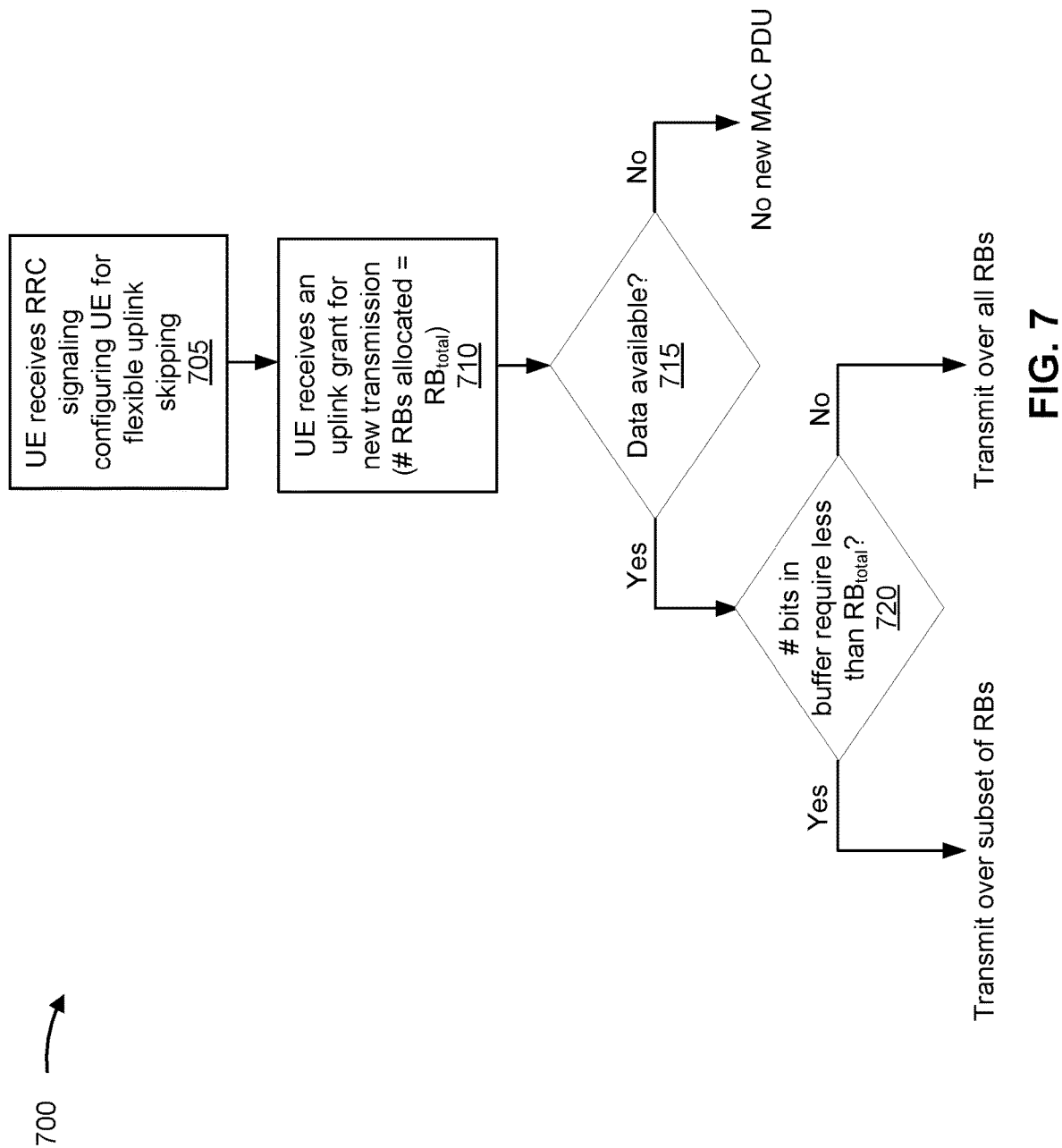
FIG. 7 is a diagram illustrating an example of skipping resources of a grant, in accordance with the present disclosure.

FIG. 7 is a diagram illustrating an example 700 of skipping resources of a grant, in accordance with the present disclosure.

According to some aspects described herein, a UE may skip resources of a grant rather than skipping the grant altogether. This flexible uplink skipping may enable the UE to select a subset of resources of the grant based at least in part on a size of the payload. As a result, the UE conserves power by not transmitting over all of the resources of the grant. In some aspects, the UE may provide a skipping indication that indicates that the UE is skipping resources of the grant and/or using only a subset (non-zero proper subset) of resources of the grant. The skipping indication may indicate the skipped resources and/or the non-skipped resources.

Example 700 shows a UE that may transmit over a subset of granted resources. As shown by reference number 705, the UE may receive a configuration for flexible uplink skipping (e.g., via RRC signaling). As shown by reference number 710, the UE may receive an uplink grant for a communication (e.g., new uplink transmission). The grant may include a number of allocated RBs (total amount of RBs). As shown by reference number 715, if data is available, the UE may determine if an amount of data in the buffer satisfies a data threshold. For example, as shown by reference number 720, if a number of bits in the buffer requires less than the total amount of RBs, the UE may transmit over a subset of the total amount of RBs. If the amount of data to be transmitted does not requires less than the total amount of RBs, the UE may transmit the data over the total amount of RBs (using all of the RBs). By using a subset of the total amount of RBs rather than no RBs or all of the RBs, the UE may reduce power consumption, conserve signaling resources, and reduce delay.

As indicated above, FIG. 7 is provided as an example. Other examples may differ from what is described with respect to FIG. 7.

Figure 8:
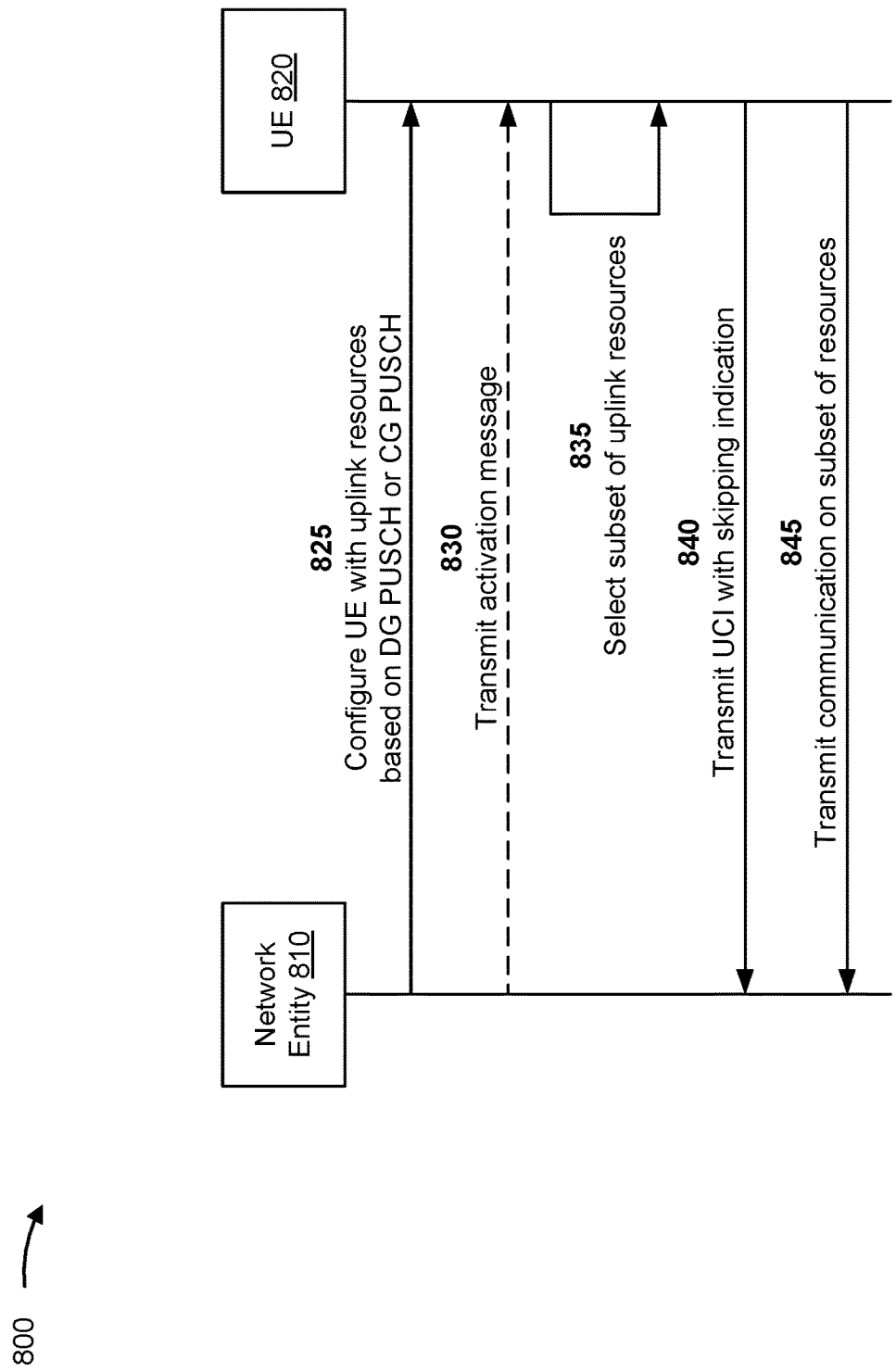
FIG. 8 is a diagram illustrating an example of skipping resources of a grant, in accordance with the present disclosure.

FIG. 8 is a diagram illustrating an example 800 of skipping resources of a grant, in accordance with the present disclosure. As shown in FIG. 8, a network entity 810 (e.g., a UE 120) and a UE 820 (e.g., a UE 120) may communicate with one another.

If the UE 820 skips resources of a grant, the UE 820 may indicate the skipped resources or the non-skipped resources to the network entity 810. Otherwise, the network entity 810 blind decodes all of the resources of a grant. Example 800 shows an example of providing a skipping indication. As shown by reference number 825, the network entity 810 configures the UE 820 with uplink resources based on a dynamic grant for a physical uplink channel (e.g., PUSCH) communication or a CG for the PUSCH communication. For example, the UE 820 may transmit a configuration that enables the UE 820 to select resources of a grant to skip or to select a subset of the resources (non-skipped resources) of the grant to use for the PUSCH communication.

In some aspects, as shown by reference number 830, the network entity 810 may transmit an activation message that activates resources of a grant. The network entity 810 may simultaneously activate multiple uplink CG per bandwidth part (BWP). The network entity 810 may simultaneously activate up to, for example, 12 uplink CGs (Type 1 and/or Type 2) on an active BWP. The uplink CGs may overlap in time. The network entity 810 may schedule separate activation or deactivation for different uplink CG Type 2 configurations via DCI (DCI Format 0_0, 0_1, or 0_2) addressed by a cell-specific radio network temporary identifier (CS-RNTI).

As shown by reference number 835, the UE 820 may select a subset of the uplink resources. This may include a non-zero quantity of RBs that is less than a total amount of RBs allocated by the grant. The UE 820 may select a subset of the frequency resources (the quantity of RBs) but use all of the time resources (e.g., symbols) of the grant. The UE may select the skipped resources in order to determine the non-skipped resources (subset of resources). That is, selecting the skipped resources may include selecting the skipped resources and/or selecting the non-skipped resources.

The UE 820 may transmit UCI that indicates skipped resources and/or non-skipped resources. As shown by reference number 840, the UE 820 may transmit UCI with a skipping indication on a PUCCH. The skipping indication may indicate one or more slot numbers, one or more symbols numbers, one or more RB numbers (e.g., individual RBs, RB range, starting RB, ending RB), the quantity of RBs, and/or one or more RB group numbers of the skipped resources or indicate one or more slot numbers, one or more symbols numbers, one or more RB numbers, the quantity of RBs, and/or one or more RB group numbers of the non-skipped resources.

In some aspects, the UE 820 may transmit the UCI in the same slot as the PUSCH or the PUSCH communication or a different slot than the PUSCH or the PUSCH communication. If the UCI is transmitted in a different slot, the UE 820 may provide a slot indicator for the UCI. In some aspects, the UE 820 may transmit the UCI with the skipping indication on the PUSCH.

In some aspects, the UE 820 may transmit the UCI in system information (SI) after the grant is received. The UE 820 may transmit the UCI dynamically, such as before every PUSCH communication or transmit the UCI aperiodically after being triggered or requested via DCI. If the UE 820 does not transmit the UCI, the UE 820 may use the resources of the grant without skipping any resources. The UE 820 may transmit the UCI once or periodically to change CG resources allocated for PUSCH communications. The network entity 810 may determine to reconfigure CG resources allocated for PUSCH communications after the UCI is received in SI.

In some aspects, if the UE 820 has data in its buffer, the UCI may be combined with other UCI feedback (e.g., acknowledgement (ACK) or negative acknowledgement (NACK)) transmitted in the PUSCH. Alternatively, if the UE 820 has data in its buffer but there is no UCI feedback, the UE 820 may transmit the UCI with SI only.

As shown by reference number 845, the UE 820 may transmit the PUSCH communication on the subset of resources (non-skipped resources). By using a subset of the resources of the grant, the UE 820 may conserve signaling resources, reduce power consumption without increasing latency.

As indicated above, FIG. 8 is provided as an example. Other examples may differ from what is described with respect to FIG. 8.

Figure 9:
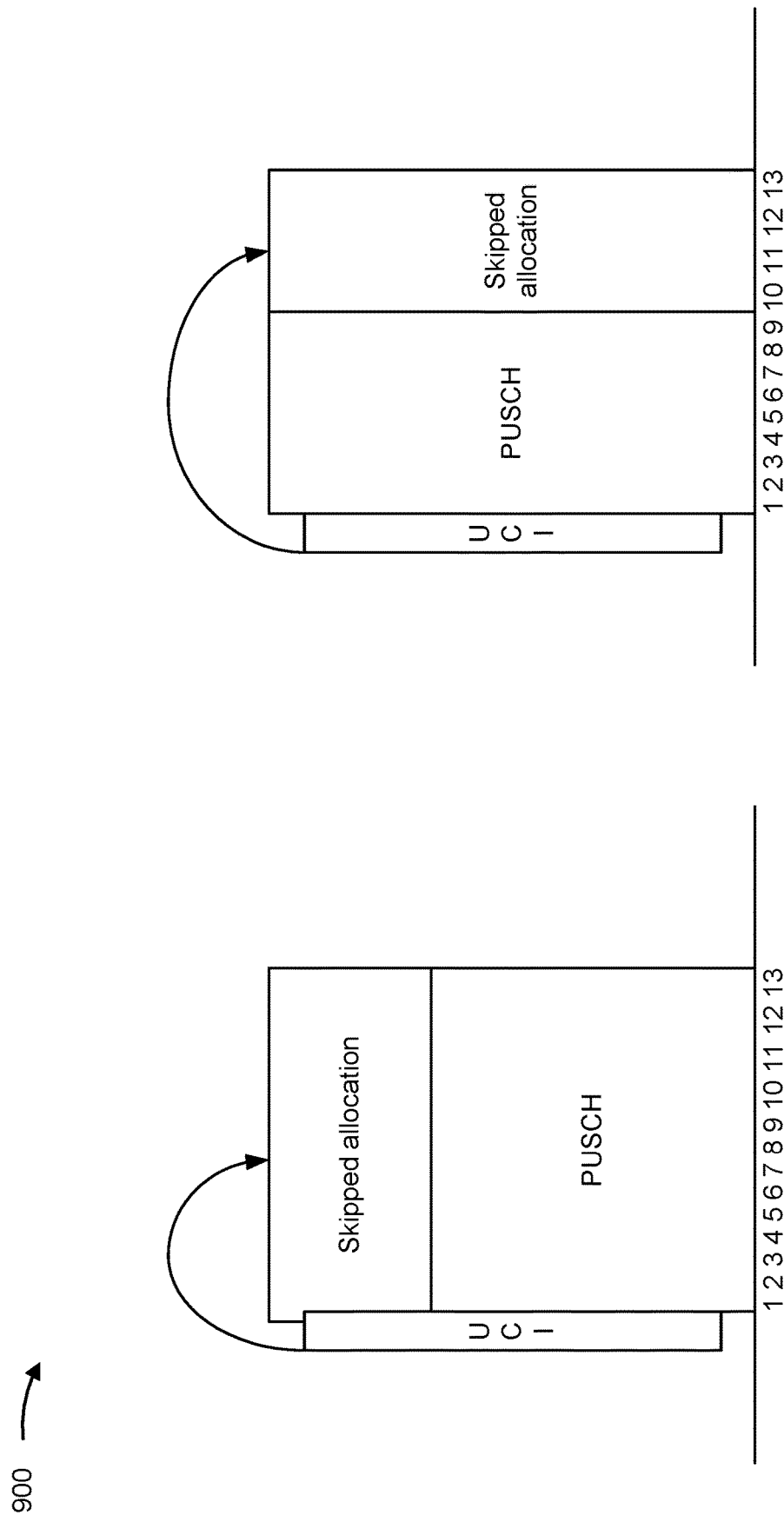
FIG. 9 is a diagram illustrating an example of a skipping indication, in accordance with the present disclosure.

FIG. 9 is a diagram illustrating an example 900 of a skipping indication, in accordance with the present disclosure.

Example 900 shows a skipping indication in UCI that indicates resources that are skipped as part of uplink flexible skipping. The skipped resources may be in the frequency domain and/or the time domain. The skipping indication may indicate, for example, for slot 0, symbols 10-13 are skipped, and PRBs greater than a specified PRB number are skipped. The skipping indication may specify one or more time-frequency sets of resources from among multiple time-frequency sets of resources (e.g., sets of PRBs, sets of symbols). The multiple time-frequency sets may be specified via RRC signaling.

In an example, if there are 14 bits available for the UCI, Set 0 may have 14 most significant bits (MSBs) that indicate a skipping indication across 14 symbols. A bit with a value of 1 may indicate that a symbol is skipped. A bit with a value of 0 may indicate that a symbol is not skipped (all RBs are used). Set 1 may have 14 MSBs that indicate whether the group of RBs in a BWP are skipped. The BWP may be divided into 14 RB groups (RBGs) and the 14 MSBs may indicate resources that are skipped over the RBGs. Set 2 may have a finer granularity for time and frequency (and require more bits). Other set definitions may be used includes a set having a pair of bits that indicate both time and frequency skipping. In some aspects, the skipping indication may indicate a transport block (TB) size for the uplink to help quantify the amount of resources that are needed.

As indicated above, FIG. 9 is provided as an example. Other examples may differ from what is described with regard to FIG. 9.

Figure 10:
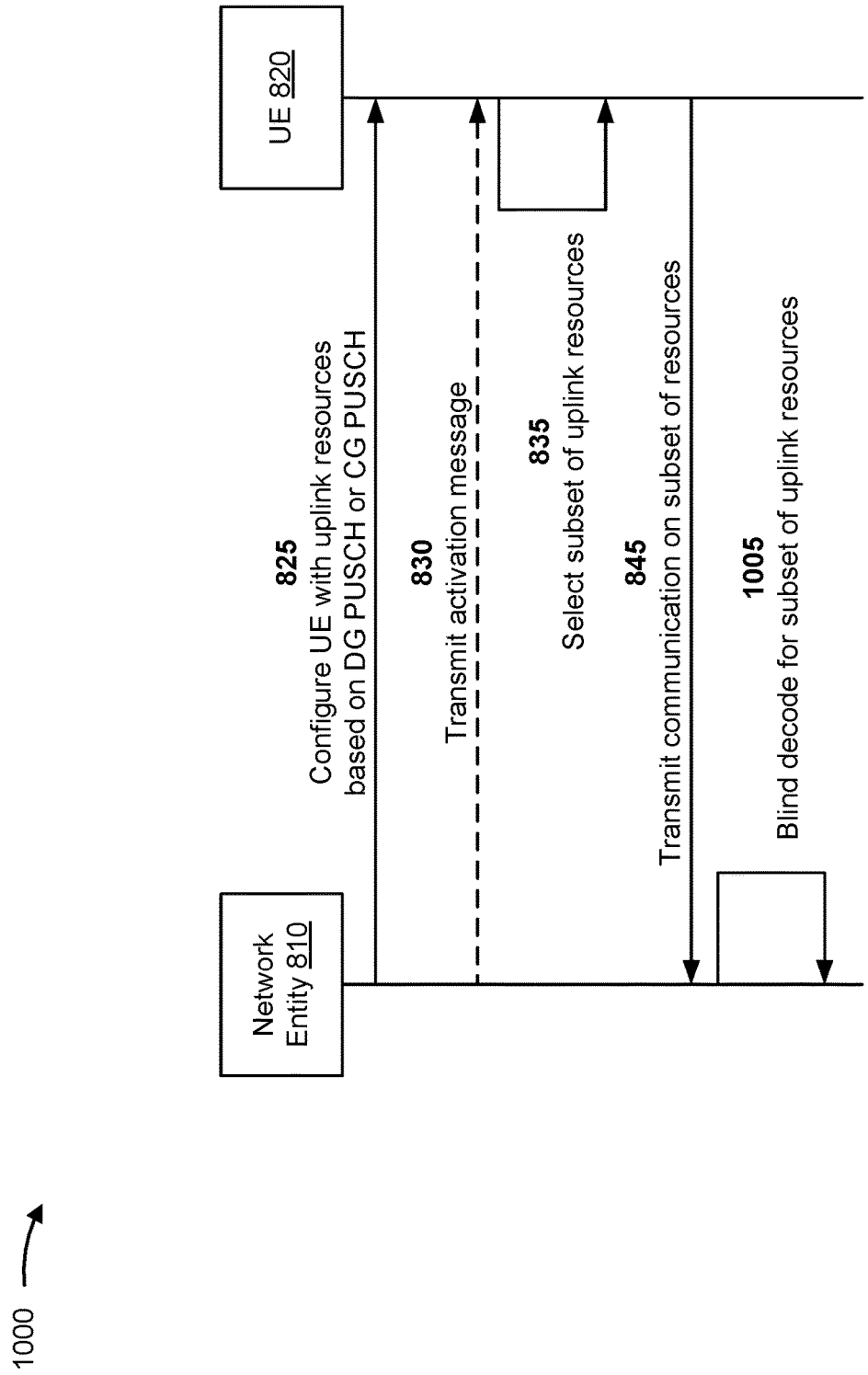
FIG. 10 is a diagram illustrating an example of using a subset of resources, in accordance with the present disclosure.

FIG. 10 is a diagram illustrating an example 1000 of using a subset of resources, in accordance with the present disclosure.

In some aspects, the UE 820 may not transmit a skipping indication in UCI. The network entity 810 will blind decode for the subset of resources of the grant. Example 1000 shows no transmission of a skipping indication. Instead, as shown by reference number 1005, the network entity blind decodes for the subset of uplink resources. This may include blind decoding for the CG that is used.

As indicated above, FIG. 10 is provided as an example. Other examples may differ from what is described with regard to FIG. 10.

Figure 11:
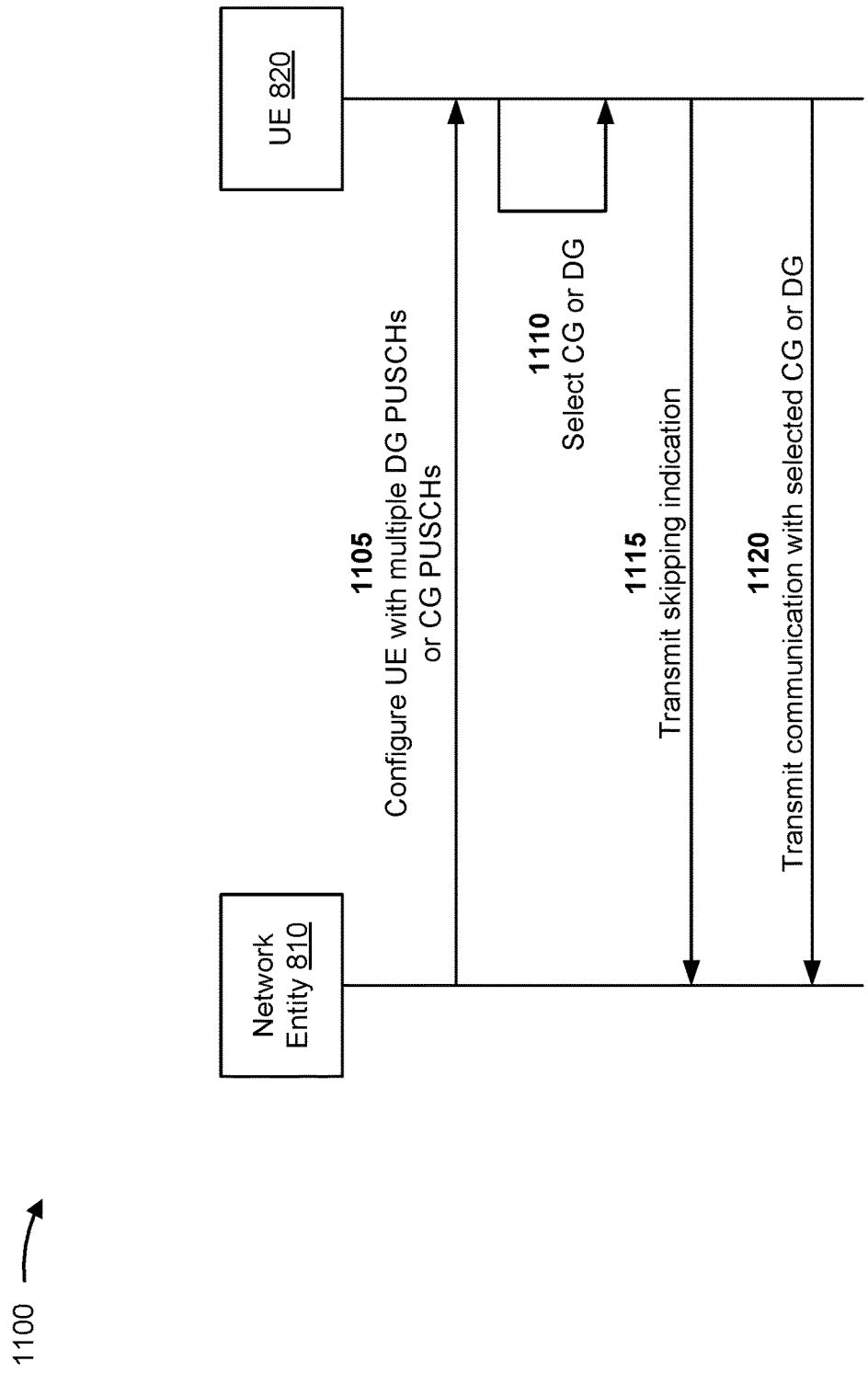
FIG. 11 is a diagram illustrating an example of selecting a grant, in accordance with the present disclosure.

FIG. 11 is a diagram illustrating an example 1100 of selecting a grant, in accordance with the present disclosure.

In some aspects, the UE 820 may be configured with multiple CG allocations, as shown by reference number 1105. For example, the UE 820 may receive multiple grant resource allocations (CGs or dynamic grants (DGs)) for a physical uplink channel (e.g., PUSCH). The multiple grant resource allocations may be received in multiple frequency domain resource assignments (FDRAs).

The UE 820 may select a subset of the multiple CG allocations or DG allocations. As shown by reference number 1110, the subset may include one CG or one DG. The subset may include multiple CGs or multiple DGs.

As shown by reference number 1115, the UE 820 may transmit a skipping indication that indicates the selected CG or DG (or multiple CGs or DGs). As shown by reference number 1120, the UE 820 may transmit a communication on the PUSCH using the selected CG or DG. The UE 820 may select a subset of resources for the selected CG or DG and transmit using the subset of resources.

In some aspects, the UE 820 may dynamically select resources within the selected CG via UCI and then continue to transmit the communication on the PUSCH. The UE 820 may indicate the selected CG or DG (e.g., via an index). The UE 820 may dynamically select uplink resources of the grant as a fraction of the FDRAs in a DG (e.g., 1/N, 2/N, ... N/N), where N is a total quantity of resources of the grant. The network entity 810 may indicate the fraction in DCI.

In some aspects, up to 8 PUSCH communications, for example, can be signaled with DCI format 0_1. To accommodate for multiple PUSCH transmissions, the time domain resource allocation (TDRA) field in the uplink grant DCI may be modified to up to 6 bits (e.g., 0, 1, 2, 3, 4, 5, or 6 bits). A higher layer parameter (e.g., pusch-TimeDomainAllocationListDCI-0-1 or pusch-TimeDomainAllocationListForMultiPUSCH) may be configured. The bitwidth for this field is determined as $\lceil \log_2(I) \rceil$ bits, where I is the number of entries in the higher layer parameter pusch-TimeDomainAllocationListDCI-0-1 or pusch-TimeDomainAllocationListForMultiPUSCH. In some aspects, the FDRA field may accommodate multiple PUSCH communications with DCI format 0_1 having different numbers of RBs. Multiple FDRA fields may be used for different allocations. This may be beneficial for multiple PUSCH communications that may be transmitted over different frequency allocations. In some aspects, DCI may include a bit that indicates that the UE 820 may select one of the multiple PUSCH communications or may select one of multiple grants or a PUSCH communication. The multiple PUSCH communications that are indicated may have partial overlapping (the multiple PUSCHs need not be contiguous). The TDRA and FDRA fields may indicate the sets that may have overlapping time and frequency resources.

As indicated above, FIG. 11 is provided as an example. Other examples may differ from what is described with regard to FIG. 11.

Figure 12:
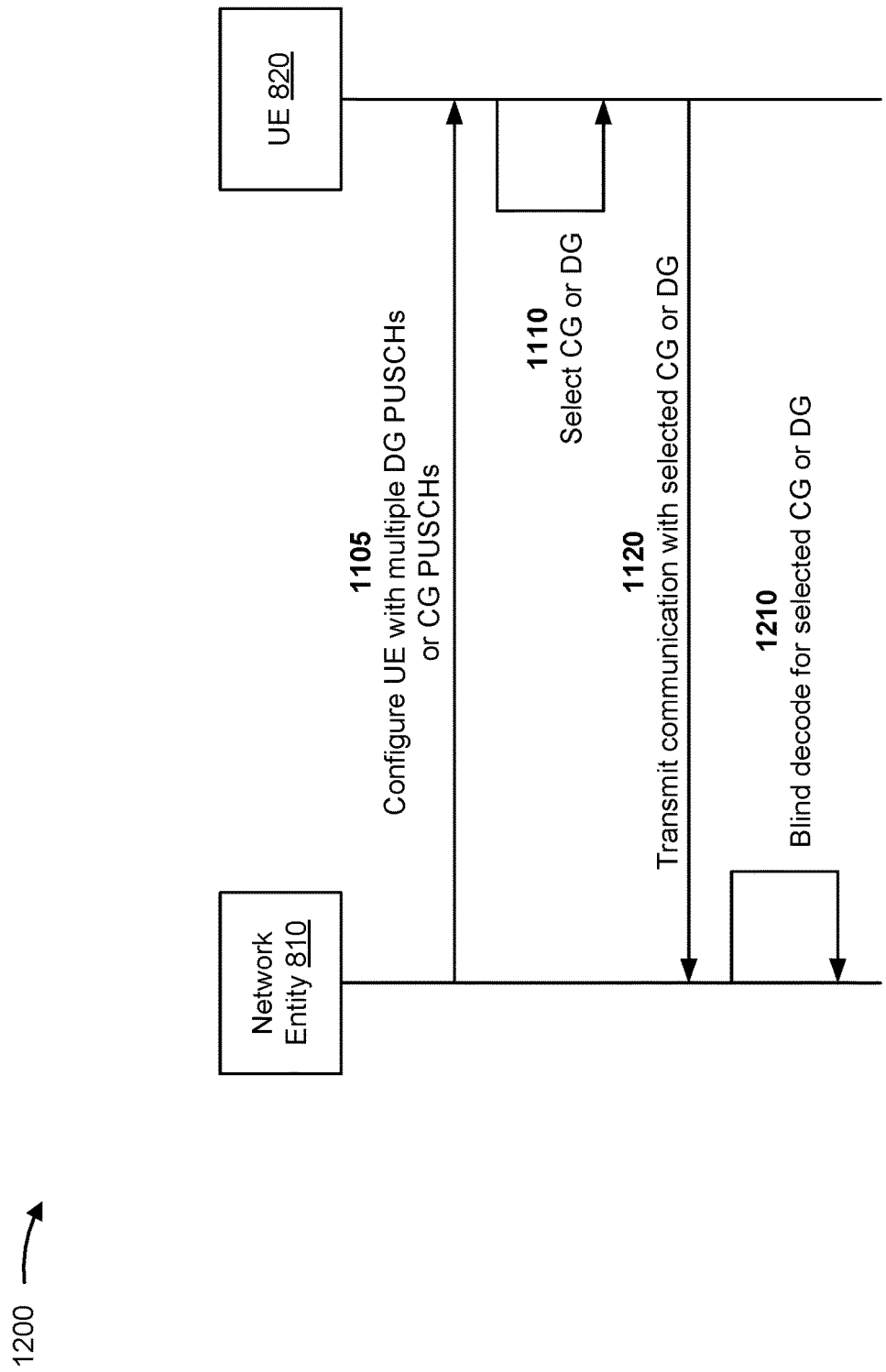
FIG. 12 is a diagram illustrating an example of selecting a grant, in accordance with the present disclosure.

FIG. 12 is a diagram illustrating an example 1200 of selecting a grant, in accordance with the present disclosure.

In some aspects, the UE 820 may dynamically select a CG or DG without transmitting a skipping indication of the selected CG or DG. The UE 820 may select the CG or DG from among multiple CGs or DGs and thus the CG or DG may be a subset of the multiple CGs or DGs. Rather than receiving a skipping indication, as shown by reference number 1210, the network entity may blind decode for the selected CG or DG.

As indicated above, FIG. 12 is provided as an example. Other examples may differ from what is described with regard to FIG. 12.

FIG. 13 is a diagram illustrating an example 1300 of skipping indications, in accordance with the present disclosure. Example 1300 shows REs that are used for PUSCH communications, a DMRS, or a phase tracking reference signal (PTRS).

Example 1300 shows an example of skipping RBs of a grant but using all symbols of the grant. Example 1300 shows that the network entity 810 may reserve some PUSCH REs as a skipping indication in an RB. The skipping indication in the REs may include a type of modulation (e.g., MCS), a zero power, or a specified reference signal. A set of REs may be reserved for the skipping indication. The REs may be configurable via RRC signaling. The skipping indication may include a resource identifier (ID), and a skipping pattern that indicates skipped or used RBs (subcarrier locations) and/or symbols (symbol locations). An RRC configuration may include a pattern type or a location of an RE. some REs may be unused.

As indicated above, FIG. 13 is provided as an example. Other examples may differ from what is described with regard to FIG. 13.

FIG. 14 is a diagram illustrating an example 1400 of skipping indications, in accordance with the present disclosure.

Example 1400 shows an example of skipping RBs of a grant but using all symbols of the grant. Example 1400 shows that the network entity 810 may reserve some PUSCH REs as a skipping indication in an RB. The REs may be front-loaded to reduce latency. The components of a PUSCH communication may be based on the quantity of symbols that are used. The skipping indication may indicate RBs (negative skipping) and/or symbols (positive skipping) in each RB.

If an RB is not skipped, the network entity 810 continues to check for reserved REs for a skipping indication in the time domain. If an RB is skipped, the network entity 810 may not continue to check REs for a skipping indication in the time domain. The network entity 810 may determine that symbols past the skipping indication are not used or used, depending on the information in the REs.

As indicated above, FIG. 14 is provided as an example. Other examples may differ from what is described with regard to FIG. 14.

FIG. 15 is a diagram illustrating an example 1500 of skipping indications, in accordance with the present disclosure.

In some aspects, to ease blind detection at the network entity 810, the network entity 810 may limit the UE 820's freedom in selecting resources to skip. While the network entity 810 may allow the UE 820 to skip some resources in the uplink, the network entity 810 may guide the UE skipping mechanism. The network entity 810 may RRC configure a starting PRB where the UE 820 is to transmit with when implementing flexible uplink skipping. The network entity 810 may also RRC configure the flexible uplink skipping with an RB comb pattern. Example 1500 shows an example of a comb pattern. The comb pattern may have an RB comb offset. Example 1500 shows an RB comb offset of 4 in example 1500 (there are 3 skipped RBs before transmission at a $4^{th}$ RB offset). The comb pattern may also have an RE comb offset, which indicates where the skipped RB starts. The comb pattern may limit the quantity of symbols that are skipped.

In some aspects, when the UE 820 transmits over a subset of RBs, the DMRS may be present in the allocated RBs. The UE 820 may first perform coherent energy detection on the DMRS positions. According to the information of the time-frequency location where the DMRS is detected, any strong signal detected by the network entity 810 on the DMRS configured resources is considered to be a valid DMRS in a used RB. An energy detection threshold may be maintained by the network entity 810, and a separate energy detection threshold can be defined for single user MIMO (SU-MIMO) or multi-user MIMO (MU-MIMO).

In some aspects, a power level of the subset of resources may be higher than a power level of another set of resources. RBs that contain uplink communications may be at power level higher than unused RBs. The network entity 810 may maintain a power level threshold to determine the power level of the unused subset of resources is higher than a power level of a used subset of resources.

As indicated above, FIG. 15 is provided as an example. Other examples may differ from what is described with regard to FIG. 15.

Figure 16:
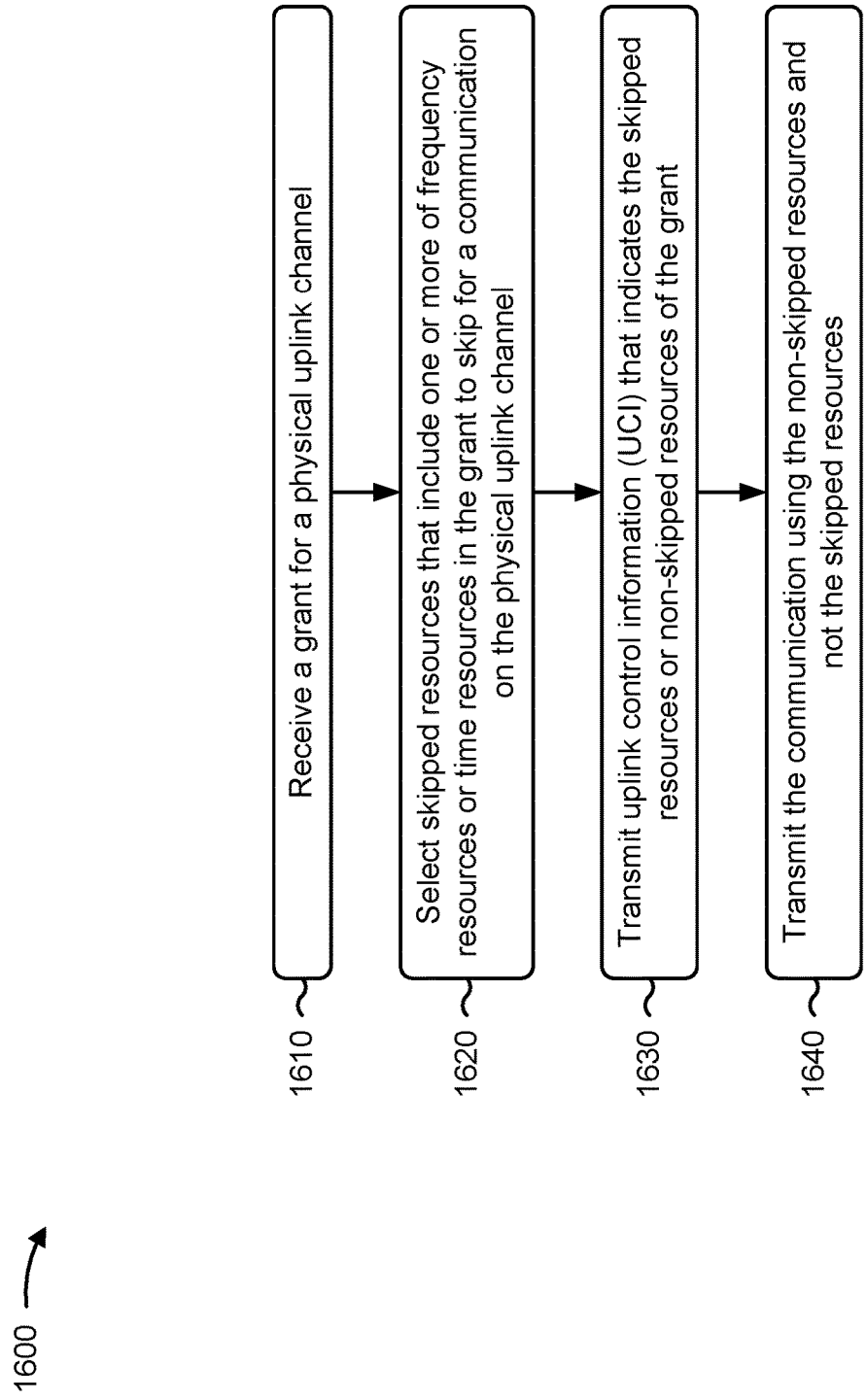
FIG. 16 is a diagram illustrating an example process performed, for example, by a UE, in accordance with the present disclosure.

FIG. 16 is a diagram illustrating an example process 1600 performed, for example, by a UE, in accordance with the present disclosure. Example process 1600 is an example where the UE (e.g., UE 120, UE 820) performs operations associated with skipping resources of a grant.

As shown in FIG. 16, in some aspects, process 1600 may include receiving a grant for a physical uplink channel (block 1610). For example, the UE (e.g., using communication manager 2008 and/or reception component 2002 depicted in FIG. 20) may receive a grant for a physical uplink channel, as described above.

As further shown in FIG. 16, in some aspects, process 1600 may include selecting skipped resources that include one or more of frequency resources or time resources in the grant to skip for a communication on the physical uplink channel (block 1620). For example, the UE (e.g., using communication manager 2008 and/or selection component 2010 depicted in FIG. 20) may select skipped resources that include one or more of frequency resources or time resources in the grant to skip for a communication on the physical uplink channel, as described above.

As further shown in FIG. 16, in some aspects, process 1600 may include transmitting UCI that indicates the skipped resources or non-skipped resources of the grant (block 1630). For example, the UE (e.g., using communication manager 2008 and/or transmission component 2004 depicted in FIG. 20) may transmit UCI that indicates the skipped resources or non-skipped resources of the grant, as described above.

As further shown in FIG. 16, in some aspects, process 1600 may include transmitting the communication using the non-skipped resources and not the skipped resources (block 1640). For example, the UE (e.g., using communication manager 2008 and/or transmission component 2004 depicted in FIG. 20) may transmit the communication using the non-skipped resources and not the skipped resources, as described above.

Process 1600 may include additional aspects, such as any single aspect or any combination of aspects described below and/or in connection with one or more other processes described elsewhere herein.

In a first aspect, transmitting the UCI includes transmitting the UCI in a same slot that includes the communication on the physical uplink channel.

In a second aspect, alone or in combination with the first aspect, transmitting the UCI includes transmitting the UCI in a slot that is different from a slot that includes the communication on the physical uplink channel.

In a third aspect, alone or in combination with one or more of the first and second aspects, transmitting the UCI includes transmitting the UCI in response to downlink control information that requests the UCI.

In a fourth aspect, alone or in combination with one or more of the first through third aspects, transmitting the UCI includes transmitting the UCI with a skipping indication on a PUCCH.

In a fifth aspect, alone or in combination with one or more of the first through fourth aspects, transmitting the UCI includes transmitting the UCI with a skipping indication on a PUSCH.

In a sixth aspect, alone or in combination with one or more of the first through fifth aspects, process 1600 includes receiving a configuration for the skipped resources.

In a seventh aspect, alone or in combination with one or more of the first through sixth aspects, the configuration specifies one or more of a starting RB, an RB comb pattern, or a resource element comb offset for the skipped resources.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
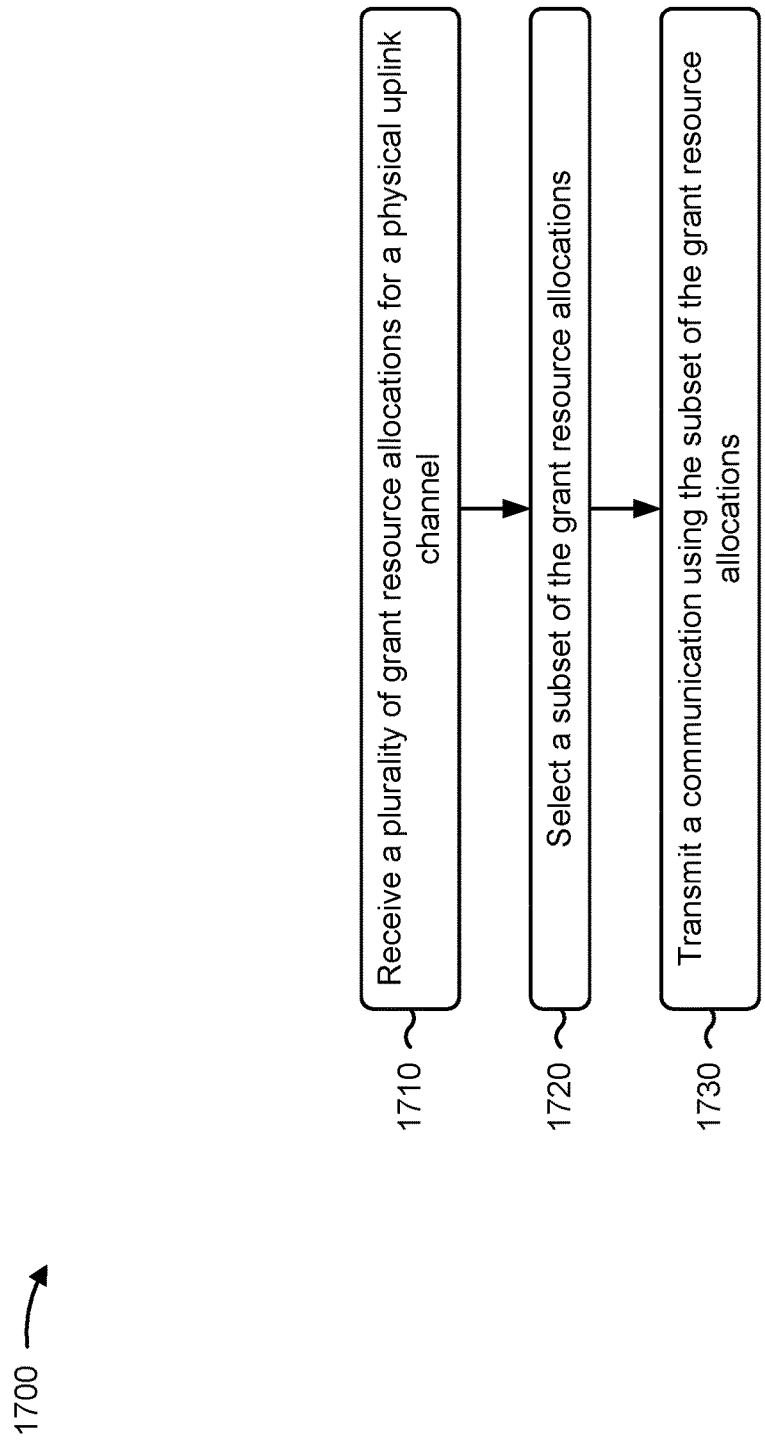
FIG. 17 is a diagram illustrating an example process performed, for example, by a UE, in accordance with the present disclosure.

FIG. 17 is a diagram illustrating an example process 1700 performed, for example, by a UE, in accordance with the present disclosure. Example process 1700 is an example where the UE (e.g., UE 120, UE 820) performs operations associated with skipping resources of a grant.

As shown in FIG. 17, in some aspects, process 1700 may include receiving a plurality of grant resource allocations for a physical uplink channel (block 1710). For example, the UE (e.g., using communication manager 2008 and/or reception component 2002 depicted in FIG. 20) may receive a plurality of grant resource allocations for a physical uplink channel, as described above.

As further shown in FIG. 17, in some aspects, process 1700 may include selecting a subset of the grant resource allocations (block 1720). For example, the UE (e.g., using communication manager 2008 and/or selection component 2010 depicted in FIG. 20) may select a subset of the grant resource allocations, as described above.

As further shown in FIG. 17, in some aspects, process 1700 may include transmitting a communication using the subset of the grant resource allocations (block 1730). For example, the UE (e.g., using communication manager 2008 and/or transmission component 2004 depicted in FIG. 20) may transmit a communication using the subset of the grant resource allocations, as described above.

Process 1700 may include additional aspects, such as any single aspect or any combination of aspects described below and/or in connection with one or more other processes described elsewhere herein.

In a first aspect, process 1700 includes transmitting UCI that indicates the subset of the grant resource allocations.

In a second aspect, alone or in combination with the first aspect, the grant resource allocations include one or more CG resource allocations.

In a third aspect, alone or in combination with one or more of the first and second aspects, the grant resource allocations include one or more DG resource allocations.

In a fourth aspect, alone or in combination with one or more of the first through third aspects, receiving the plurality of grant resource allocations includes receiving the plurality of grant resource allocations in a plurality of FDRAs.

In a fifth aspect, alone or in combination with one or more of the first through fourth aspects, receiving the plurality of grant resource allocations includes receiving an indication that the UE can select the subset of the grant resource allocations.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
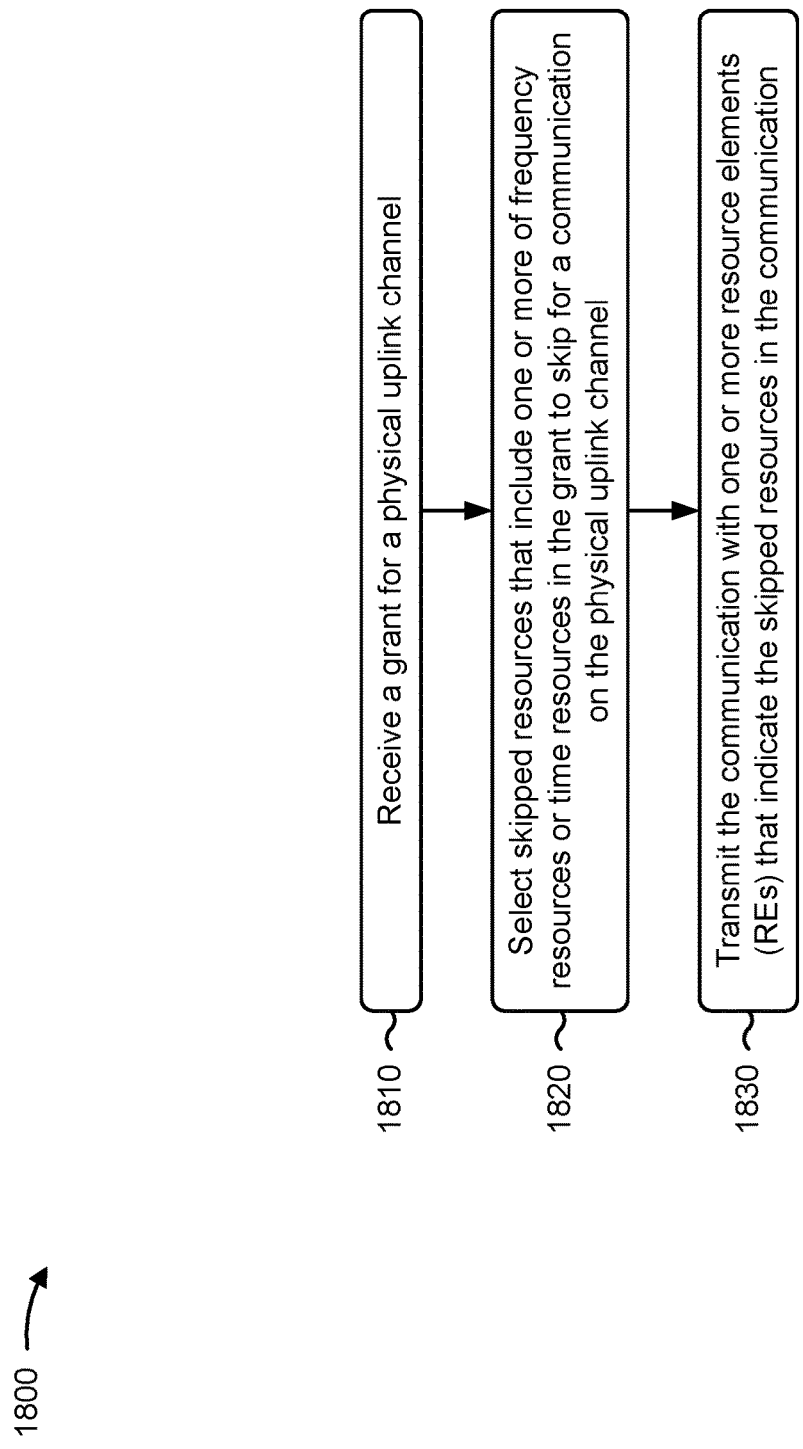
FIG. 18 is a diagram illustrating an example process performed, for example, by a UE, in accordance with the present disclosure.

FIG. 18 is a diagram illustrating an example process 1800 performed, for example, by a UE, in accordance with the present disclosure. Example process 1800 is an example where the UE (e.g., UE 120, UE 820) performs operations associated with skipping resources of a grant.

As shown in FIG. 18, in some aspects, process 1800 may include receiving a grant for a physical uplink channel (block 1810). For example, the UE (e.g., using communication manager 2008 and/or reception component 2002 depicted in FIG. 20) may receive a grant for a physical uplink channel, as described above.

As further shown in FIG. 18, in some aspects, process 1800 may include selecting skipped resources that include one or more of frequency resources or time resources in the grant to skip for a communication on the physical uplink channel (block 1820). For example, the UE (e.g., using communication manager 2008 and/or selection component 2010 depicted in FIG. 20) may select skipped resources that include one or more of frequency resources or time resources in the grant to skip for a communication on the physical uplink channel, as described above.

As further shown in FIG. 18, in some aspects, process 1800 may include transmitting the communication with one or more REs that indicate the skipped resources in the communication (block 1830). For example, the UE (e.g., using communication manager 2008 and/or transmission component 2004 depicted in FIG. 20) may transmit the communication with one or more REs that indicate the skipped resources in the communication, as described above.

Process 1800 may include additional aspects, such as any single aspect or any combination of aspects described below and/or in connection with one or more other processes described elsewhere herein.

In a first aspect, the one or more REs include a specified modulation, zero power, or a specified reference signal.

In a second aspect, alone or in combination with the first aspect, the one or more REs are reserved for indicating the skipped resources.

In a third aspect, alone or in combination with one or more of the first and second aspects, the skipped resources use all symbols of the grant but skip one or more resource blocks or subcarriers in one or more symbols of the grant.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
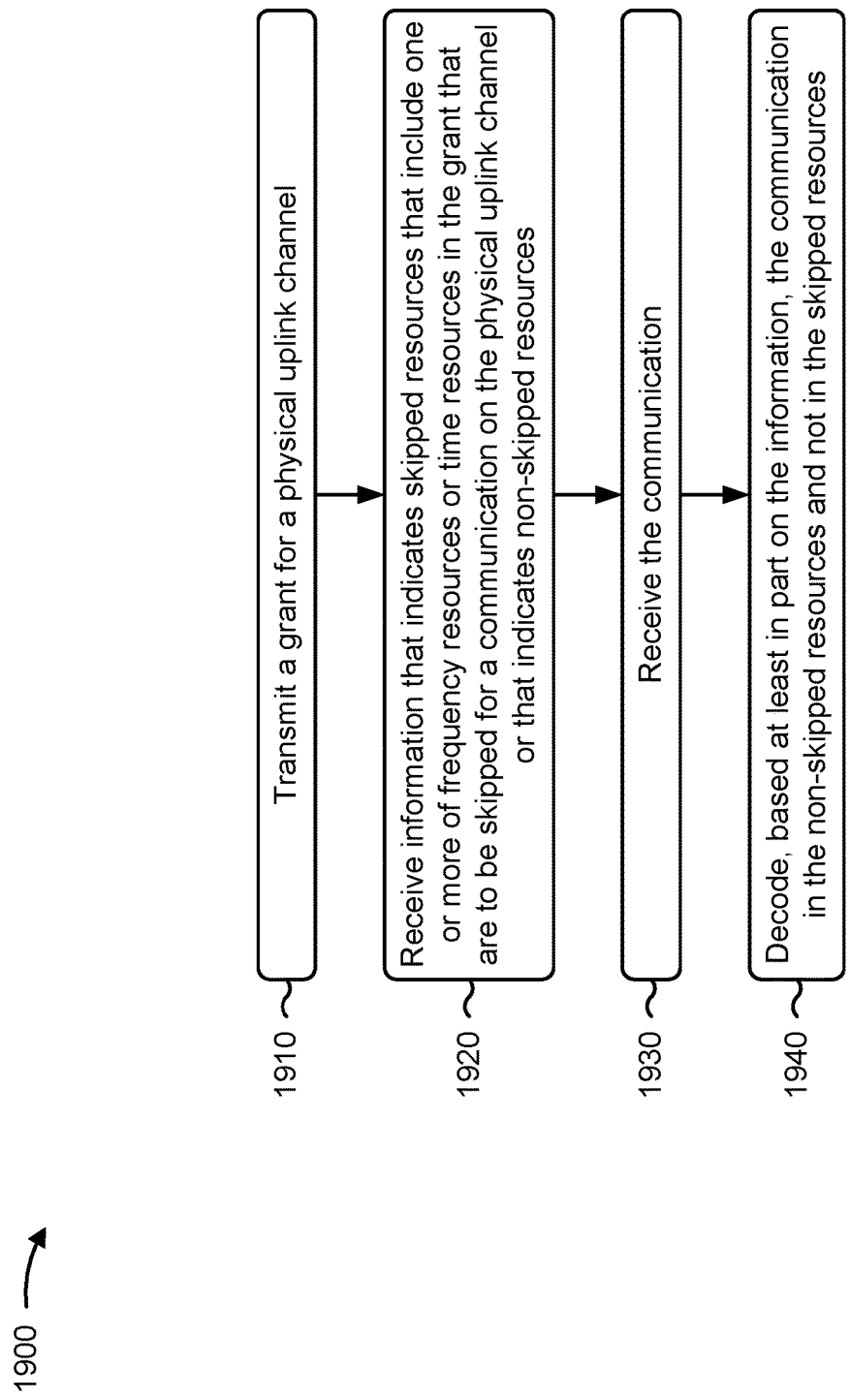
FIG. 19 is a diagram illustrating an example process performed, for example, by a network entity, in accordance with the present disclosure.

FIG. 19 is a diagram illustrating an example process 1900 performed, for example, by a network entity, in accordance with the present disclosure. Example process 1900 is an example where the network entity (e.g., base station 110, network entity 810) performs operations associated with decoding skipped resources of a grant.

As shown in FIG. 19, in some aspects, process 1900 may include transmitting a grant for a physical uplink channel (block 1910). For example, the network entity (e.g., using communication manager 2108 and/or transmission component 2104 depicted in FIG. 21) may transmit a grant for a physical uplink channel, as described above.

As further shown in FIG. 19, in some aspects, process 1900 may include receiving information that indicates skipped resources that include one or more of frequency resources or time resources in the grant that are to be skipped for a communication on the physical uplink channel or that indicates non-skipped resources (block 1920). For example, the network entity (e.g., using communication manager 2108 and/or reception component 2102 depicted in FIG. 21) may receive information that indicates skipped resources that include one or more of frequency resources or time resources in the grant that are to be skipped for a communication on the physical uplink channel or that indicates non-skipped resources, as described above.

As further shown in FIG. 19, in some aspects, process 1900 may include receiving the communication (block 1930). For example, the network entity (e.g., using communication manager 2108 and/or reception component 2102 depicted in FIG. 21) may receive the communication, as described above.

As further shown in FIG. 19, in some aspects, process 1900 may include decoding, based at least in part on the information, the communication in the non-skipped resources and not in the skipped resources (block 1940). For example, the network entity (e.g., using communication manager 2108 and/or decoding component 2110 depicted in FIG. 21) may decode, based at least in part on the information, the communication in the non-skipped resources and not in the skipped resources, as described above.

Process 1900 may include additional aspects, such as any single aspect or any combination of aspects described below and/or in connection with one or more other processes described elsewhere herein.

In a first aspect, process 1900 includes transmitting a configuration for the skipped resources.

In a second aspect, alone or in combination with the first aspect, the configuration specifies one or more of a starting RB, an RB comb pattern, or a resource element comb offset for the skipped resources.

In a third aspect, alone or in combination with one or more of the first and second aspects, the information includes UCI.

In a fourth aspect, alone or in combination with one or more of the first through third aspects, the information indicates a subset of grant resource allocations.

In a fifth aspect, alone or in combination with one or more of the first through fourth aspects, process 1900 includes detecting the non-skipped resources based at least in part on an energy level of the non-skipped resources satisfying an energy threshold.

In a sixth aspect, alone or in combination with one or more of the first through fifth aspects, process 1900 includes validating a DMRS of the non-skipped resources based at least in part on an energy level of the DMRS satisfying an energy threshold.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
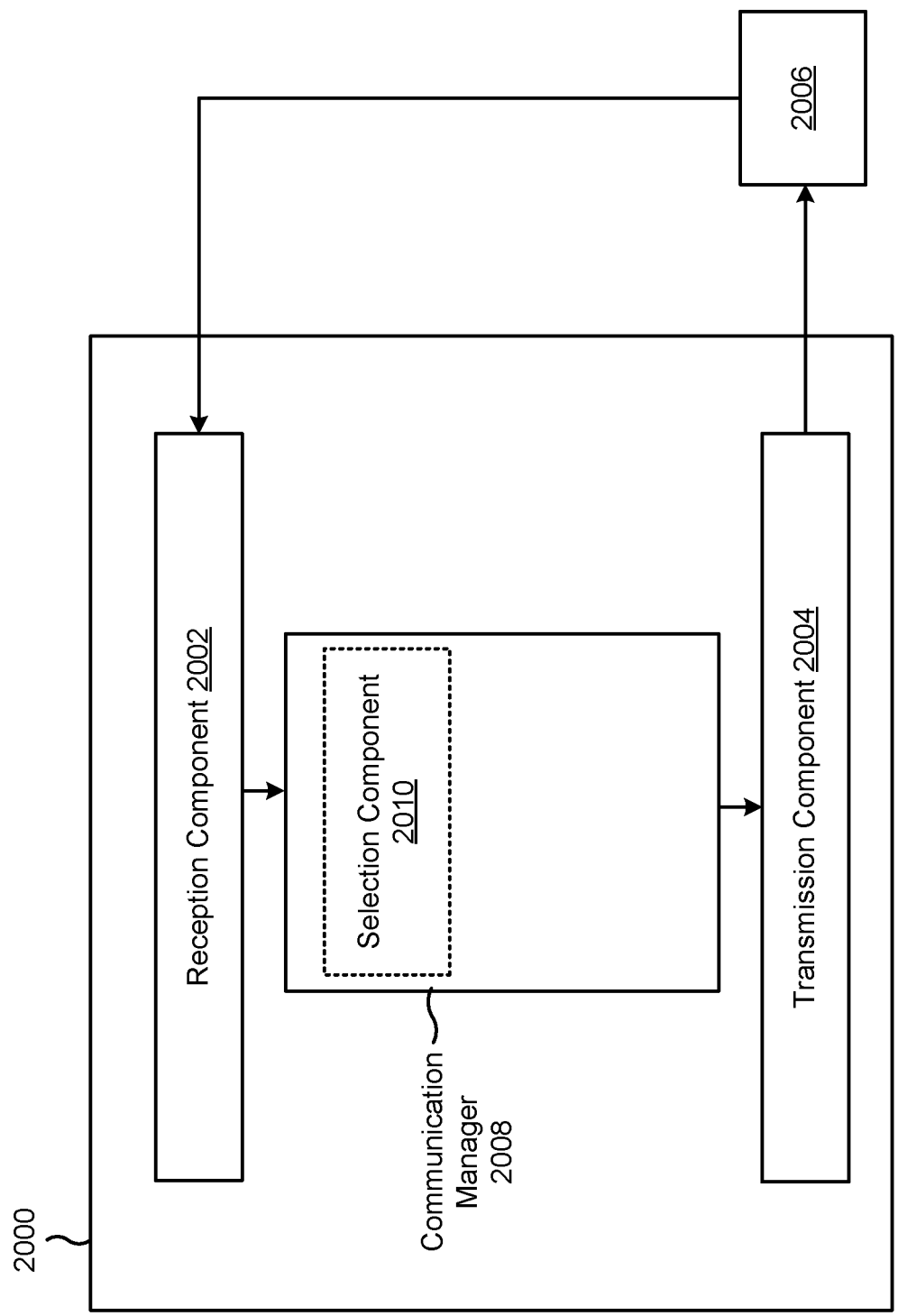
FIGS. 20-21 are diagrams of example apparatuses for wireless communication, in accordance with the present disclosure.

FIG. 20 is a diagram of an example apparatus 2000 for wireless communication. The apparatus 2000 may be a UE (e.g., a UE 120, UE 820), or a UE may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include the communication manager 2008. The communication manager 2008 may control and/or otherwise manage one or more operations of the reception component 2002 and/or the transmission component 2004. In some aspects, the communication manager 2008 may include one or more antennas, a modem, a controller/processor, a memory, or a combination thereof, of the UE described in connection with FIG. 2. The communication manager 2008 may be, or be similar to, the communication manager 140 depicted in FIGS. 1 and 2. For example, in some aspects, the communication manager 2008 may be configured to perform one or more of the functions described as being performed by the communication manager 140. In some aspects, the communication manager 2008 may include the reception component 2002 and/or the transmission component 2004. The communication manager 2008 may include a selection component 2010, among other examples.

In some aspects, the apparatus 2000 may be configured to perform one or more operations described herein in connection with FIGS. 1-15. Additionally, or alternatively, the apparatus 2000 may be configured to perform one or more processes described herein, such as process 1600 of FIG. 16, process 1700 of FIG. 17, process 1800 of FIG. 18, or a combination thereof. In some aspects, the apparatus 2000 and/or one or more components shown in FIG. 20 may include one or more components of the UE described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a modem, a demodulator, a MIMO detector, a receive processor, a controller/processor, a memory, or a combination thereof, of the UE described in connection with FIG. 2.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modem, a modulator, a transmit MIMO processor, a transmit processor, a controller/processor, a memory, or a combination thereof, of the UE described in connection with FIG. 2. In some aspects, the transmission component 2004 may be co-located with the reception component 2002 in a transceiver.

In some aspects, the reception component 2002 may receive a grant for a physical uplink channel. The selection component 2010 may select skipped resources that include one or more of frequency resources or time resources in the grant to skip for a communication on the physical uplink channel. The transmission component 2004 may transmit UCI that indicates the skipped resources or non-skipped resources of the grant. The transmission component 2004 may transmit the communication using the non-skipped resources and not the skipped resources. The reception component 2002 may receive a configuration for the skipped resources.

In some aspects, the reception component 2002 may receive a plurality of grant resource allocations for a physical uplink channel. The selection component 2010 may select a subset of the grant resource allocations. The transmission component 2004 may transmit a communication using the subset of the grant resource allocations. The transmission component 2004 may transmit uplink control information that indicates the subset of the grant resource allocations.

The reception component 2002 may receive a grant for a physical uplink channel. The selection component 2010 may select skipped resources that include one or more of frequency resources or time resources in the grant to skip for a communication on the physical uplink channel. The transmission component 2004 may transmit the communication with one or more REs that indicate the skipped resources in the communication.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

Figure 21:
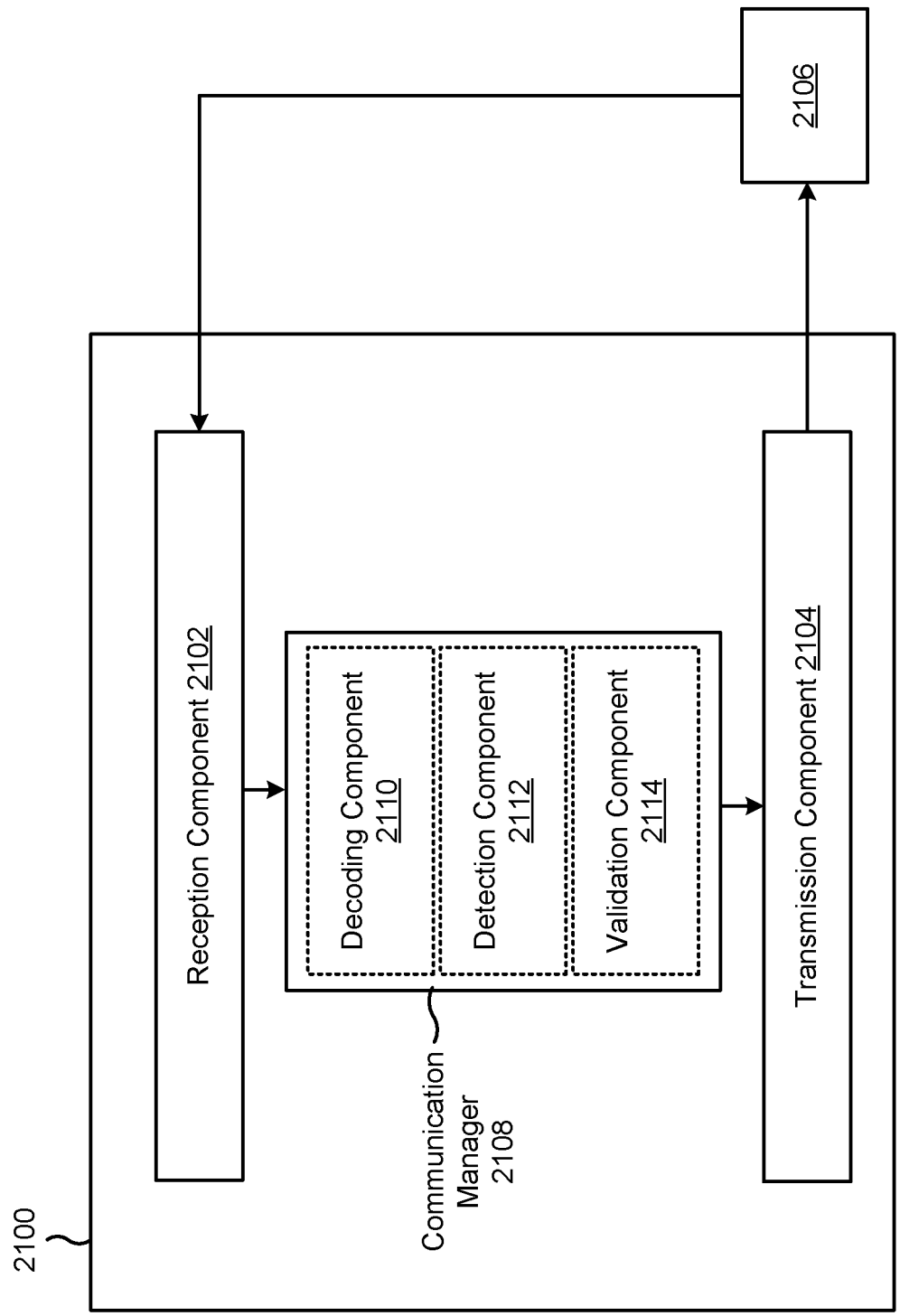

FIG. 21 is a diagram of an example apparatus 2100 for wireless communication. The apparatus 2100 may be a network entity (e.g., a base station 110, network entity 810), or a network entity may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 2108. The communication manager 2108 may control and/or otherwise manage one or more operations of the reception component 2102 and/or the transmission component 2104. In some aspects, the communication manager 2108 may include one or more antennas, a modem, a controller/processor, a memory, or a combination thereof, of the network entity described in connection with FIG. 2. The communication manager 2108 may be, or be similar to, the communication manager 150 depicted in FIGS. 1 and 2. For example, in some aspects, the communication manager 2108 may be configured to perform one or more of the functions described as being performed by the communication manager 150. In some aspects, the communication manager 2108 may include the reception component 2102 and/or the transmission component 2104. The communication manager 2108 may include a decoding component 2110, detection component 2112, and validation component 2114, among other examples.

In some aspects, the apparatus 2100 may be configured to perform one or more operations described herein in connection with FIGS. 1-15. Additionally, or alternatively, the apparatus 2100 may be configured to perform one or more processes described herein, such as process 1900 of FIG. 19. In some aspects, the apparatus 2100 and/or one or more components shown in FIG. 21 may include one or more components of the network entity described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the network entity described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the network entity described in connection with FIG. 2. In some aspects, the transmission component 2104 may be co-located with the reception component 2102 in a transceiver.

The transmission component 2104 may transmit a grant for a physical uplink channel. The reception component 2102 may receive information that indicates skipped resources that include one or more of frequency resources or time resources in the grant that are to be skipped for a communication on the physical uplink channel or that indicates non-skipped resources. The reception component 2102 may receive the communication. The decoding component 2110 may decode, based at least in part on the information, the communication in the non-skipped resources and not in the skipped resources. The transmission component 2104 may transmit a configuration for the skipped resources.

The detection component 2112 may detect the non-skipped resources based at least in part on an energy level of the non-skipped resources satisfying an energy threshold. The validation component 2114 may validate a DMRS of the non-skipped resources based at least in part on an energy level of the DMRS satisfying an energy threshold.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

The following provides an overview of some Aspects of the present disclosure:

Aspect 1: A method of wireless communication performed by a user equipment (UE), comprising: receiving a grant for a physical uplink channel; selecting skipped resources that include one or more of frequency resources or time resources in the grant to skip for a communication on the physical uplink channel; transmitting uplink control information (UCI) that indicates the skipped resources or non-skipped resources of the grant; and transmitting the communication using the non-skipped resources and not the skipped resources.

Aspect 2: The method of Aspect 1, wherein transmitting the UCI includes transmitting the UCI in a same slot that includes the communication on the physical uplink channel.

Aspect 3: The method of Aspect 1, wherein transmitting the UCI includes transmitting the UCI in a slot that is different from a slot that includes the communication on the physical uplink channel.

Aspect 4: The method of Aspect 1, wherein transmitting the UCI includes transmitting the UCI in response to downlink control information that requests the UCI.

Aspect 5: The method of Aspect 1, wherein transmitting the UCI includes transmitting the UCI with a skipping indication on a physical uplink control channel.

Aspect 6: The method of Aspect 1, wherein transmitting the UCI includes transmitting the UCI with a skipping indication on a physical uplink shared channel.

Aspect 7: The method of any of Aspects 1-6, further comprising receiving a configuration for the skipped resources.

Aspect 8: The method of Aspect 7, wherein the configuration specifies one or more of a starting resource block (RB), an RB comb pattern, or a resource element comb offset for the skipped resources.

Aspect 9: A method of wireless communication performed by a user equipment (UE), comprising: receiving a plurality of grant resource allocations for a physical uplink channel; selecting a subset of the grant resource allocations; and transmitting a communication using the subset of the grant resource allocations.

Aspect 10: The method of Aspect 9, further comprising transmitting uplink control information that indicates the subset of the grant resource allocations.

Aspect 11: The method of Aspect 9 or 10, wherein the grant resource allocations include one or more configured grant resource allocations.

Aspect 12: The method of any of Aspects 9-11, wherein the grant resource allocations include one or more dynamic grant resource allocations.

Aspect 13: The method of any of Aspects 9-12, wherein receiving the plurality of grant resource allocations includes receiving the plurality of grant resource allocations in a plurality of frequency domain resource assignments.

Aspect 14: The method of any of Aspects 9-13, wherein receiving the plurality of grant resource allocations includes receiving an indication that the UE can select the subset of the grant resource allocations.

Aspect 15: A method of wireless communication performed by a user equipment (UE), comprising: receiving a grant for a physical uplink channel; selecting skipped resources that include one or more of frequency resources or time resources in the grant to skip for a communication on the physical uplink channel; and transmitting the communication with one or more resource elements (REs) that indicate the skipped resources in the communication.

Aspect 16: The method of Aspect 15, wherein the one or more REs include a specified modulation, zero power, or a specified reference signal.

Aspect 17: The method of Aspect 15 or 16, wherein the one or more REs are reserved for indicating the skipped resources.

Aspect 18: The method of any of Aspects 15-17, wherein the skipped resources use all symbols of the grant but skip one or more resource blocks or subcarriers in one or more symbols of the grant.

Aspect 19: A method of wireless communication performed by a network entity, comprising: transmitting a grant for a physical uplink channel; receiving information that indicates skipped resources that include one or more of frequency resources or time resources in the grant that are to be skipped for a communication on the physical uplink channel or that indicates non-skipped resources; receiving the communication; and decoding, based at least in part on the information, the communication in the non-skipped resources and not in the skipped resources.

Aspect 20: The method of Aspect 19, further comprising transmitting a configuration for the skipped resources.

Aspect 21: The method of Aspect 20, wherein the configuration specifies one or more of a starting resource block (RB), an RB comb pattern, or a resource element comb offset for the skipped resources.

Aspect 22: The method of any of Aspects 19-21, wherein the information includes uplink control information.

Aspect 23: The method of any of Aspects 19-22, wherein the information indicates a subset of grant resource allocations.

Aspect 24: The method of Aspect 23, further comprising detecting the non-skipped resources based at least in part on an energy level of the non-skipped resources satisfying an energy threshold.

Aspect 25: The method of any of Aspects 19-24, further comprising validating a demodulation reference signal (DMRS) of the non-skipped resources based at least in part on an energy level of the DMRS satisfying an energy threshold.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, individually or collectively configured to cause the UE to:
receive a grant for a physical uplink channel;
select skipped resources that include one or more of frequency resources or time resources in the grant to skip for a communication on the physical uplink channel;
transmit, periodically, uplink control information (UCI) to change resources allocated for physical uplink shared channel (PUSCH) communications, wherein the UCI indicates that the UE is skipping the skipped resources and using only a subset of resources of the grant, wherein the UE selects the subset of resources based at least in part on a size of a payload; and
transmit the communication using the subset of resources of the grant and not the skipped resources.

2. The UE of claim 1, wherein the one or more processors, to cause the UE to transmit the UCI, are configured to cause the UE to transmit the UCI in a same slot that includes the communication on the physical uplink channel.

3. The UE of claim 1, wherein the one or more processors, to cause the UE to transmit the UCI, are configured to cause the UE to transmit the UCI in a slot that is different from a slot that includes the communication on the physical uplink channel.

4. The UE of claim 1, wherein the one or more processors, to cause the UE to transmit the UCI, are configured to cause the UE to transmit the UCI in response to downlink control information that requests the UCI.

5. The UE of claim 1, wherein the one or more processors, to cause the UE to transmit the UCI, are configured to cause the UE to transmit the UCI with a skipping indication on a physical uplink control channel (PUCCH).

6. The UE of claim 1, wherein the one or more processors, to cause the UE to transmit the UCI, are configured to cause the UE to transmit the UCI with a skipping indication on a PUSCH.

7. The UE of claim 1, wherein the one or more processors are configured to cause the UE to receive a configuration for the skipped resources.

8. The UE of claim 7, wherein the configuration specifies one or more of a starting resource block (RB), an RB comb pattern, or a resource element comb offset for the skipped resources.

9. A user equipment (UE) for wireless communication, comprising:
one or more memories; and
one or more processors, coupled to the one or more memories, individually or collectively configured cause the UE to:
receive a plurality of grant resource allocations for a physical uplink channel;
select a subset of the grant resource allocations based at least in part on a size of a payload;
transmit, periodically, uplink control information (UCI) to change resources allocated for physical uplink shared channel (PUSCH) communications, wherein the UCI is transmitted with a skipping indication that indicates that the UE is using only the subset of the grant resource allocations; and
transmit a communication using the subset of the grant resource allocations.

10. The UE of claim 9, wherein the UCI indicates the subset of the grant resource allocations.

11. The UE of claim 9, wherein the grant resource allocations include one or more configured grant resource allocations.

12. The UE of claim 9, wherein the grant resource allocations include one or more dynamic grant resource allocations.

13. The UE of claim 9, wherein the one or more processors, to cause the UE to receive the plurality of grant resource allocations, are configured to cause the UE to receive the plurality of grant resource allocations in a plurality of frequency domain resource assignments.

14. The UE of claim 9, wherein the one or more processors, to cause the UE to receive the plurality of grant resource allocations, are configured to cause the UE to receive an indication that the UE can select the subset of the grant resource allocations.

15. A user equipment (UE) for wireless communication, comprising:
one or more memories; and
one or more processors, coupled to the one or more memories, individually or collectively configured to cause the UE to:
receive a grant for a physical uplink channel;
select skipped resources that include one or more of frequency resources or time resources in the grant to skip for a communication on the physical uplink channel;
transmit, periodically, uplink control information (UCI) to change resources allocated for physical uplink shared channel (PUSCH) communication, wherein the UCI is transmitted with a skipping indication that indicates the UE is skipping the skipped resources and using only a subset of resources of the grant, wherein the UE selects the subset of resources based at least in part on a size of a payload; and
transmit the communication with one or more resource elements (REs) that indicate the skipped resources in the communication.

16. The UE of claim 15, wherein the one or more REs include a specified modulation, zero power, or a specified reference signal.

17. The UE of claim 15, wherein the one or more REs are reserved for indicating the skipped resources.

18. The UE of claim 15, wherein the skipped resources use all symbols of the grant but skip one or more resource blocks or subcarriers in one or more symbols of the grant.

19. A network entity for wireless communication, comprising:
one or more memories; and
one or more processors, coupled to the one or more memories, individually or collectively configured to cause the network entity to:
transmit a grant for a physical uplink channel;
receive, periodically, uplink control information (UCI) to change resources allocated for physical uplink shared channel (PUSCH) communications, wherein the UCI indicates a user equipment (UE) is (i) skipping resources that include one or more of frequency resources or time resources in the grant and (ii) using, for a communication, only a subset of resources of the grant, wherein the subset of resources is based at least in part on a size of a payload;
receive the communication; and
decode, based at least in part on the UCI, the communication in the subset of resources and not in the skipped resources.

20. The network entity of claim 19, wherein the one or more processors are configured to cause the network entity to transmit a configuration for the skipped resources.

21. The network entity of claim 20, wherein the configuration specifies one or more of a starting resource block (RB), an RB comb pattern, or a resource element comb offset for the skipped resources.

22. The network entity of claim 19, wherein the UCI is received in system information (SI).

23. The network entity of claim 19, wherein the UCI indicates a subset of grant resource allocations.

24. The network entity of claim 23, wherein the one or more processors are configured to cause the network entity to detect non-skipped resources based at least in part on an energy level of the non-skipped resources satisfying an energy threshold.

25. The network entity of claim 19, wherein the one or more processors are configured to cause the network entity to validate a demodulation reference signal (DMRS) of non-skipped resources based at least in part on an energy level of the DMRS satisfying an energy threshold.

* * * * *